(12) United States Patent
Song et al.

(10) Patent No.: US 12,497,393 B2
(45) Date of Patent: Dec. 16, 2025

(54) β-LACTAM COMPOUND, USE THEREOF AND PREPARATION METHOD THEREFOR

(71) Applicant: INSTITUTE OF MEDICINAL BIOTECHNOLOGY, CHINESE ACADEMY OF MEDICAL SCIENCES, Beijing (CN)

(72) Inventors: Danqing Song, Beijing (CN); Sheng Tang, Beijing (CN); Xuefu You, Beijing (CN); Zhiwen Li, Beijing (CN); Yanxiang Wang, Beijing (CN); Xi Lu, Beijing (CN); Yinghong Li, Beijing (CN); Xinxin Hu, Beijing (CN); Zhihao Guo, Beijing (CN); Xiukun Wang, Beijing (CN)

(73) Assignees: INSTITUTE OF MEDICINAL BIOTECHNOLOGY, CHINESE ACADEMY OF MEDICAL, Beijing (CN); GUANGZHOU HC PHARMACEUTICAL CO. LTD, Guangdong (CN)

(*) Notice: Subject to any disclaimer, the term of this patent is extended or adjusted under 35 U.S.C. 154(b) by 516 days.

(21) Appl. No.: 18/000,444

(22) PCT Filed: Apr. 30, 2021

(86) PCT No.: PCT/CN2021/091320
§ 371 (c)(1),
(2) Date: Dec. 1, 2022

(87) PCT Pub. No.: WO2021/244199
PCT Pub. Date: Dec. 9, 2021

(65) Prior Publication Data
US 2023/0227444 A1 Jul. 20, 2023

(30) Foreign Application Priority Data
Jun. 2, 2020 (CN) .......................... 202010488264.1

(51) Int. Cl.
C07D 417/12 (2006.01)

(52) U.S. Cl.
CPC ................................. C07D 417/12 (2013.01)

(58) Field of Classification Search
CPC .................................................. C07D 417/12
See application file for complete search history.

(56) References Cited

U.S. PATENT DOCUMENTS

| 4,610,824 A | 9/1986 | Truener |
| 4,638,060 A | 1/1987 | Sundeen et al. |
| 4,684,722 A | 8/1987 | Sundeen |
| 4,751,220 A | 6/1988 | Parker et al. |
| 4,816,582 A | 3/1989 | Furlenmeier et al. |
| 5,194,604 A | 3/1993 | Denzel et al. |
| 10,501,454 B2 * | 12/2019 | Yang ..................... C07D 417/14 |
| 2014/0275007 A1 | 9/2014 | Glinka et al. |
| 2016/0051523 A1 | 2/2016 | Aulakh et al. |
| 2017/0298057 A1 | 10/2017 | Gordon |

FOREIGN PATENT DOCUMENTS

| CN | 1055736 A | 10/1991 |
| CN | 1058593 A | 2/1992 |
| CN | 106164072 A | 11/2016 |

(Continued)

OTHER PUBLICATIONS

Chemical Abstracts Registry No. 89410-34-4, indexed in the Registry file on STN CAS Online Nov. 16, 1984. (Year: 1984).*
Tan et al., Journal of Medicinal Chemistry (2017), 60(7), 2669-2684. (Year: 2017).*
American Chemical Society. "RN=109885-32-7, RN=109885-35-0", Stnext, 1987, pp. 1-3.
Bush et al., "Improved sensitivity in assays for binding of novel beta-lactam antibiotics to penicillin-binding proteins of *Escherichia coli*", Antimicrobial Agents and Chemotherapy, vol. 31, No. 8, Aug. 1, 1987, pp. 1271-1273.

(Continued)

*Primary Examiner* — Laura L Stockton
(74) *Attorney, Agent, or Firm* — Judy Jarecki-Black; Sharon Ngwenya

(57) ABSTRACT

The present invention relates to a compound as shown in general formula (I) below (in formula (I), each of $R_1$ and $R_2$ independently represents a hydrogen atom or a C1-10 linear or branched alkyl optionally having a substituent, or the two together form a cycloalkyl with 3 to 8 ring carbon atoms; each of $R_3$ and $R_4$ independently represents a hydrogen atom or a C1-10 linear or branched alkyl optionally having a substituent or a C6-12 aryl optionally having a substituent, or the two together form a cycloalkyl with 3 to 8 ring carbon atoms; X represents C or N; and Y represents a linear or branched alkenyl or alkynyl with 2 to 6 carbon atoms and optionally having a substituent, or carboxyl). The compound has good antibacterial properties against bacteria, especially gram-negative bacteria, has low drug resistance, and has good prospects for the effective treatment of various conditions.

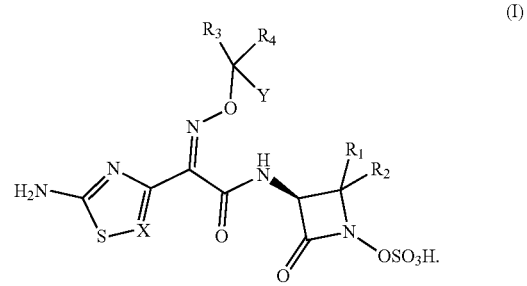

9 Claims, No Drawings

(56) References Cited

FOREIGN PATENT DOCUMENTS

| CN | 113754651 A | | 12/2021 | |
|---|---|---|---|---|
| EP | 0229012 A1 | | 7/1987 | |
| EP | 3122745 A1 | | 2/2017 | |
| JP | 58-113174 A | | 7/1983 | |
| JP | 58-206589 A | | 12/1983 | |
| JP | 61-091187 A | | 5/1986 | |
| WO | 2013/110643 A1 | | 8/2013 | |
| WO | 2015/103583 A1 | | 7/2015 | |
| WO | 2017/050218 A1 | | 3/2017 | |
| WO | WO-2018014823 A1 | * | 1/2018 | ......... A61K 31/4436 |
| WO | 2021/244199 A1 | | 12/2021 | |

OTHER PUBLICATIONS

Extended European Search Report and Search Opinion received for EP Application No. 21818212, mailed on Jun. 12, 2024, 10 pages.

Kou et al., "Design, synthesis and biological evaluation of C(4) substituted monobactams as antibacterial agents against multidrug-resistant Gram-negative bacteria", European Journal of Medicinal Chemistry, vol. 51, May 10, 2018, pp. 98-109.

Li et al., "Synthesis and antibacterial evaluation against resistant Gram-negative bacteria of monobactams bearing various substituents on oxime residue", Bioorganic Chemistry, vol. 94, Jan. 2020.

Matsuda et al., "In-vitro antibacterial activity of BO-1165, a new monobactam antibiotic", J Antimicrob Chemother., vol. 17, No. 6, 1986, pp. 747-753.

Office Action received for Japanese Application No. 2022-574453, mailed on Apr. 2, 2025, 17 pages (7 pages of original office action and 10 pages of English Translation).

Office Action received for Japanese Application No. 2022-574453, mailed on May 20, 2025, 10 pages (4 pages of original office action and 6 pages of English Translation).

Sykes et al., "The new monobactams: chemistry and biology", The Journal of Clinical Parmacology, vol. 28, No. 2, 1986, pp. 113-119.

Tanaka et al., "In vitro evaluation of tigemonam, a novel oral monobactam", Antimicrobial Agents and Chemotherapy, vol. 31, No. 2, Feb. 1, 1987, pp. 219-225.

William et al., "Monobactams Ring Activating N-1-Substituents in Monocyclic b-Lactam Antibiotics", Heterocycles, vol. 21, No. 1, 1984, pp. 191-209.

International Preliminary Report on Patentability received for PCT Patent Application No. PCT/CN2021/091320, mailed on Dec. 15, 2022, 13 pages (7 pages of English Translation and 6 pages of Original Document).

International Search Report and Written Opinion received for PCT Patent Application No. PCT/CN2021/091320, mailed on Aug. 2, 2021, 21 pages (10 pages of English Translation and 11 pages of Original Document).

Slusarchyk, W. A., B-Lactam synthesis: Chemospecific sulfonation and cyclization of the β-hydroxyvaline nucleus, Tetrahedron Letters, vol. 27, No. 25, 1986, pp. 2789-2792.

Yoshida, C., et al., Studies on monocyclic B-lactam antibiotics.II. Synthesis and antibacterial activity of 3-acylamino-2-azetidinone-I-oxysulfonic acids, Journal of Antibiotics, vol. 38, No. 11, 1985, 1536-1549.

* cited by examiner

β-LACTAM COMPOUND, USE THEREOF AND PREPARATION METHOD THEREFOR

CROSS-REFERENCE TO RELATED APPLICATIONS

This application is a national stage application, filed under 35 U.S.C. § 371, of International Patent Application No. PCT/CN2021/091320, filed on Apr. 30, 2021, which claims benefit of and priority to Chinese Application No. 202010488264.1, filed on Jun. 2, 2020.

TECHNICAL FIELD

The present invention relates to a novel β-lactam compound and a preparation method thereof. Said β-lactam compound has excellent antibacterial efficacy against bacteria, especially Gram-negative bacteria, while showing negligible drug resistance, and thus it is suitable for preparing an antibacterial agent having excellent properties.

BACKGROUND

To date, various antibacterial agents such as β-lactams, aminoglycosides, tetracyclines, fluoroquinolones, glycopeptides, and macrolides have been developed. In particular, β-lactams, for example aztreonam as shown in the following formula, have become one of the most predominant antibacterial drugs in the treatment of severe bacterial infections thanks to their broad antibacterial spectra, strong antibacterial activity, high stability against β-lactamases and the like, and low toxicity. However, aztreonam has unsatisfactory antibacterial activity against some bacteria, especially Gram-negative bacteria. To overcome this disadvantage, derivatives of aztreonam have been synthesized and studied successively. For instance, Patent Documents 1 to 3 as listed below disclose related derivatives of aztreonam. However, there is still ample room for improving the derivatives of aztreonam that are currently available in terms of their drug resistance.

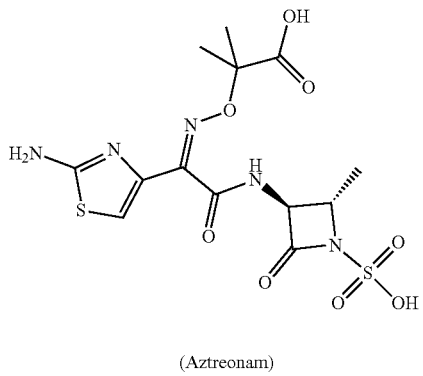 [SMILES: C[C@H]1[C@H](NC(=O)/C(=N\OC(C)(C)C(=O)O)c2csc(N)n2)C(=O)N1S(=O)(=O)O]

(Aztreonam)

PRIOR-ART DOCUMENTS

Patent Documents

Patent Document 1: CN106164072A
Patent Document 2: U.S. Pat. No. 4,816,582A
Patent Document 3: WO2017/050218A1

SUMMARY OF THE INVENTION

Problem to be Solved by the Invention

The present invention is aimed at solving the technical problem of providing a novel β-lactam compound having excellent antibacterial activity against Gram-negative bacteria while showing negligible drug resistance, and also the use and preparation method thereof.

Technical Means for Solving the Problem

The present invention is elucidated as follows:

[1] A compound of the general formula (I) or a pharmaceutically acceptable salt thereof:

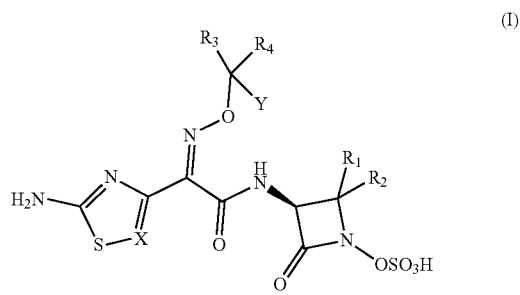

wherein, $R_1$ and $R_2$, independently of one another, represent a hydrogen atom or an optionally substituted linear or branched C1-10 alkyl; or $R_1$ and $R_2$ together form a C3-8 cycloalkyl;

$R_3$ and $R_4$, independently of one another, represent a hydrogen atom, an optionally substituted linear or branched C1-10 alkyl, or an optionally substituted C6-12 aryl; or $R_3$ and $R_4$ together form a C3-8 cycloalkyl;

X represents C or N; and

Y represents an optionally substituted linear or branched C2-6 alkenyl or alkynyl, or carboxyl.

[2] The compound or pharmaceutically acceptable salt thereof according to [1], wherein the compound is as shown in the following general formula (I-1):

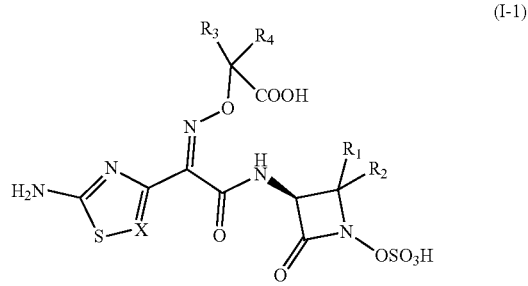

wherein, $R_1$, $R_2$, $R_3$, $R_4$ and X are as defined above.

[3] The compound or pharmaceutically acceptable salt thereof according to [1] or [2], wherein the compound is as shown in the following general formula (A):

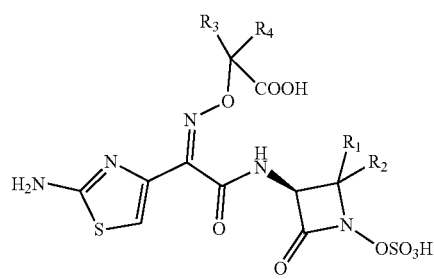

wherein, $R_1$, $R_2$, $R_3$ and $R_4$ are as defined above.

[4] The compound or pharmaceutically acceptable salt thereof according to any of [1] to [3], wherein $R_3$ and $R_4$ together form a C3-8 cycloalkyl.

[5] The compound or pharmaceutically acceptable salt thereof according to any of [1] to [4], wherein $R_1$ and $R_2$ together form a C3-8 cycloalkyl.

[6] The compound or pharmaceutically acceptable salt thereof according to any of [1] to [4], wherein the compound is a compound as shown in the formula below:

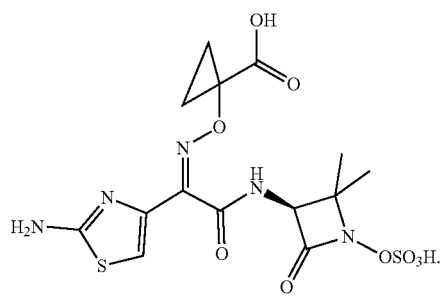

[7] The compound or pharmaceutically acceptable salt thereof according to [1], wherein the compound is as shown in the following general formula (I-2):

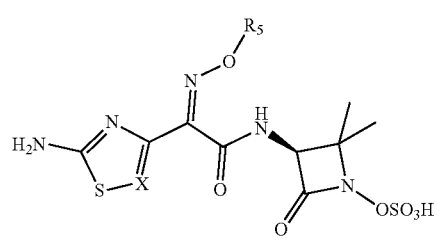

(I-2)

wherein, $R_5$ represents optionally substituted C3-7 alkenyl or alkynyl; and

X is as defined above.

[8] The compound or pharmaceutically acceptable salt thereof according to [7], wherein the compound is as shown in the following general formula (B):

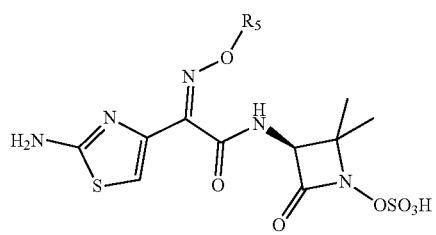

wherein, $R_5$ is as defined above.

[9] The compound or pharmaceutically acceptable salt thereof according to [8], wherein the compound is selected from the compounds as shown below:

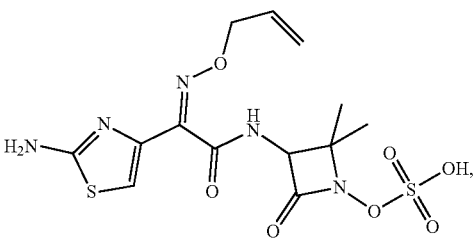

and

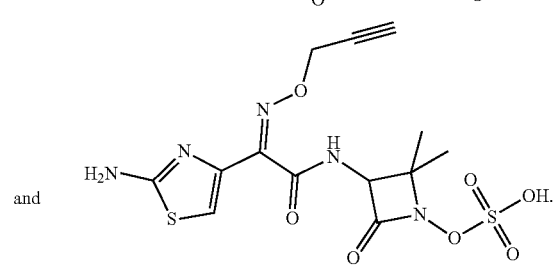

[10] A method for preparing a compound of the general formula (I), comprising: step a of reacting a compound of formula (1) with a compound of formula (2) to obtain a compound of formula (3):

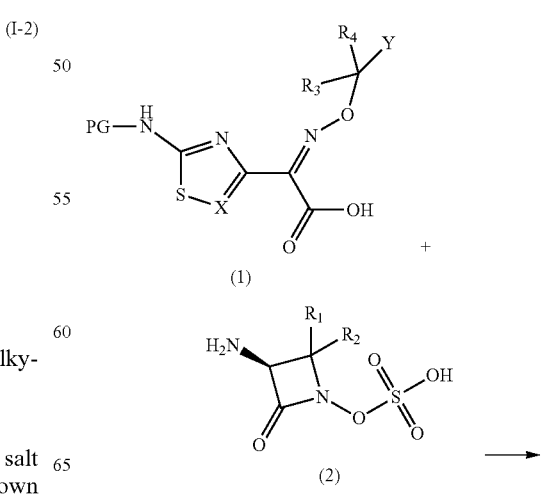

-continued

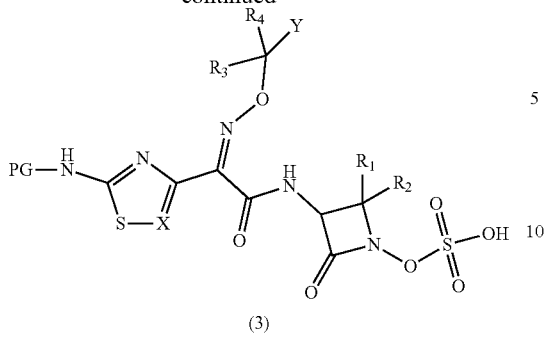

wherein,
PG represents a protecting group;
$R_1$ and $R_2$, independently of one another, represent a hydrogen atom or an optionally substituted linear or branched C1-10 alkyl; or
$R_1$ and $R_2$ together form a C3-8 cycloalkyl;
$R_3$ and $R_4$, independently of one another, represent a hydrogen atom, an optionally substituted linear or branched C1-10 alkyl, or an optionally substituted C6-12 aryl; or
$R_3$ and $R_4$ together form a C3-8 cycloalkyl;
X represents C or N; and
Y represents an optionally substituted linear or branched C2-6 alkenyl or alkynyl, or carboxyl; and
step b of
removing the protecting group by reacting the compound of formula (3) with trifluoroacetic acid and triethylsilane to obtain the compound of the general formula (I),

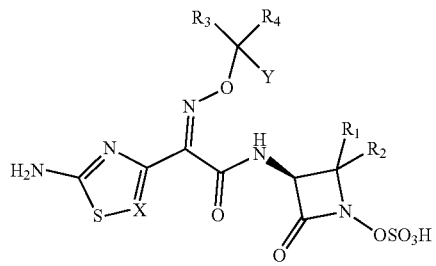

wherein,
$R_1$, $R_2$, $R_3$, $R_4$, X and Y are as defined above.

[11] Use of the compound of the general formula (I) in the manufacture of an antibacterial agent against Gram-negative bacteria,

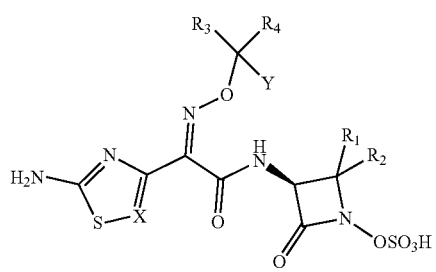

wherein,
$R_1$ and $R_2$, independently of one another, represent a hydrogen atom or an optionally substituted linear or branched C1-10 alkyl; or $R_1$ and $R_2$ together form a C3-8 cycloalkyl;
$R_3$ and $R_4$, independently of one another, represent a hydrogen atom, an optionally substituted linear or branched C1-10 alkyl, or an optionally substituted C6-12 aryl; or
$R_3$ and $R_4$ together form a C3-8 cycloalkyl;
X represents C or N; and
Y represents an optionally substituted linear or branched C2-6 alkenyl or alkynyl, or carboxyl.

Inventive Effects

The compounds of the present invention have excellent antibacterial activity against Gram-negative bacteria, such as *Escherichia coli*, *Klebsiella pneumoniae*, *Pseudomonas aeruginosa*, *Acinetobacter baumannii*, *Enterobacter cloacae*, *Enterobacter aerogenes*, *Salmonella typhi*, *Serratia marcescens*, *Citrobacter freundii*, *Providencia rettgeri*, *Proteus vulgaris*, *Proteus mirabilis*, *Stenotrophomonas maltophilia*, and *Shigella flexneri*, while showing negligible drug resistance.

DETAILED DESCRIPTION OF THE INVENTION

First, the terms used herein are defined as follows:
The term "optionally substituted" means being substituted by any one or any combination of two or more groups listed thereafter at one or more positions.
The term "halogen" or "halo" may be fluorine, chlorine, bromine or iodine.
The term "C1-X (e.g. C1-10) alkyl" means a linear or branched alkyl group having 1-X (e.g. 1-10) carbon atoms, such as methyl, ethyl, propyl, isopropyl, 1,1-dimethylpropyl, 1,2-dimethylpropyl, 1-ethylpropyl, butyl, tert-butyl, pentyl and hexyl. It can be interpreted as alkyl groups of various morphological structures including C1, C2, C3, C4, C5, C6, C7, C8, . . . CX (e.g. C10), and are not limited to the exemplary groups listed above.
The above-mentioned alkyl groups of various morphological structures refer to various possible linear or branched groups, such as butyl, including n-butyl, isobutyl, and tert-butyl.
The term "C3-X (e.g. C3-8) cycloalkyl" means a cycloalkyl group having 3-X (e.g. 3-8) ring-forming carbon atoms, such as cyclopropyl, cyclobutyl, cyclopentyl, cyclohexyl and cycloheptyl. It can be interpreted as cycloalkyl groups of various morphological structures including C3, C4, C5, C6, . . . CX (e.g. C8), and are not limited to the exemplary groups listed above.
The term "C6-X (e.g. C6-12) aryl" means an aryl group having 6-X (e.g. 6-12) carbon atoms. It can be interpreted as aryl groups of various morphological structures including C6, C7, C8, . . . CX (e.g. C12), and are not limited to the exemplary groups listed above.
The term "C2-X (e.g. C2-6) alkenyl" means a linear or branched alkenyl group having 2-X (e.g. 2-6) carbon atoms. It can be interpreted as alkenyl groups of various morphological structures including C2, C3, . . . CX (e.g. C6), and are not limited to the exemplary groups listed above.
The term "C2-X (e.g. C2-6) alkynyl" means a linear or branched alkynyl group having 2-X (e.g. 2-6) carbon atoms. It can be interpreted as alkynyl groups of various morphological structures including C2, C3, . . . CX (e.g. C6), and are not limited to the exemplary groups listed above.

The term "carboxyl" means the group —COOH.

The substituents used herein are selected from the group consisting of C1-C6 alkoxy optionally having one or more halogen atoms, C1-C6 alkyl optionally having one or more halogen atoms, C1-C6 alkylthio optionally having one or more halogen atoms, thio, oxo, cyano, hydroxyl, nitro and halogen atoms.

When optical isomers and geometric isomers are present in the compound of the present invention, they include all possible isomeric forms thereof.

In one aspect, the present invention provides a compound of the following general formula (I) or a pharmaceutically acceptable salt thereof:

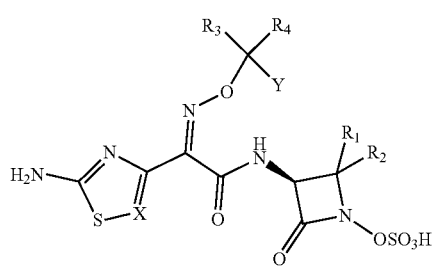

(I)

wherein,
$R_1$ and $R_2$, independently of one another, represent a hydrogen atom or an optionally substituted linear or branched C1-10 alkyl; or
$R_1$ and $R_2$ together form a C3-8 cycloalkyl;
$R_3$ and $R_4$, independently of one another, represent a hydrogen atom, an optionally substituted linear or branched C1-10 alkyl, or an optionally substituted C6-12 aryl; or
$R_3$ and $R_4$ together form a C3-8 cycloalkyl;
X represents C or N; and
Y represents an optionally substituted linear or branched C2-6 alkenyl or alkynyl, or carboxyl.

$R_1$ and $R_2$, independently of one another, represent a hydrogen atom or an optionally substituted linear or branched C1-10 alkyl; or $R_1$ and $R_2$ together form a C3-8 cycloalkyl; preferably represent an optionally substituted linear or branched C1-10 alkyl; more preferably represent an optionally substituted linear or branched C1-6 alkyl; even more preferably represent an optionally substituted linear or branched C1-3 alkyl; and particularly preferably represent methyl.

$R_3$ and $R_4$, independently of one another, represent a hydrogen atom, an optionally substituted linear or branched C1-10 alkyl, or an optionally substituted C6-12 aryl; or
$R_3$ and $R_4$ together form a C3-8 cycloalkyl;
preferably represent a hydrogen atom, an optionally substituted linear or branched C1-6 alkyl; or $R_3$ and $R_4$ together form a C3-6 cycloalkyl;
more preferably represent a hydrogen atom, an optionally substituted linear or branched C1-6 alkyl; or $R_3$ and $R_4$ together form a C3-6 cycloalkyl; and
particularly preferably represent a hydrogen atom or isopropyl; or $R_3$ and $R_4$ together form a C3-6 cycloalkyl.

Y represents an optionally substituted linear or branched C2-6 alkenyl or alkynyl, or carboxyl; preferably represents optionally substituted linear or branched C2-4 alkenyl or alkynyl, or carboxyl; and particularly preferably represents optionally substituted vinyl, optionally substituted ethynyl, or carboxyl.

The forms of the compounds according to the present invention can be listed below: [Form 1] The compound of the general formula (I) according to the present invention in which Y represents carboxyl, i.e., the compound of the general formula (I-1) as shown below:

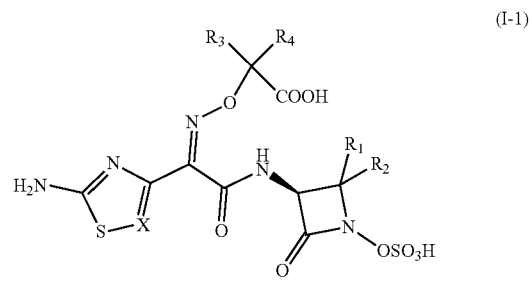

(I-1)

wherein,
$R_1$, $R_2$, $R_3$, $R_4$ and X are as defined above.

[Form 2] The compound of the general formula (I) according to the present invention in which Y represents an optionally substituted C2-6 alkenyl or alkynyl, i.e., the compound of the general formula (I-2) as shown below:

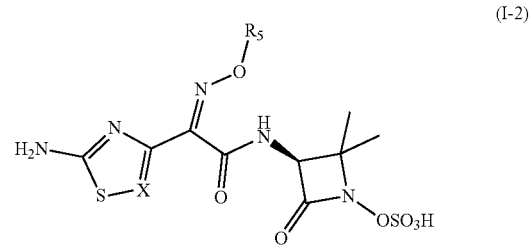

(I-2)

wherein,
$R_5$ represents optionally substituted C3-7 alkenyl or alkynyl; and
X is as defined above.

[Form 3] The compound of the following general formula (I-1-1)

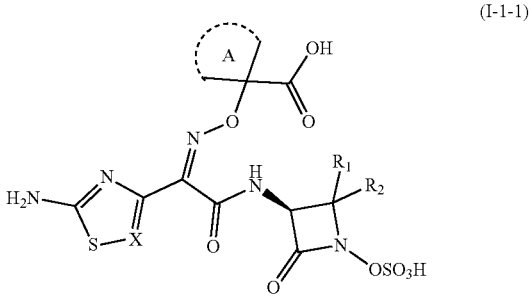

(I-1-1)

wherein,
R1 and R2, independently of one another, represent a hydrogen atom, methyl or ethyl; ring A represents C3-6 cycloalkyl; and
X represents C or N.

[Form 4] The compound of the following general formula (I-1-2)

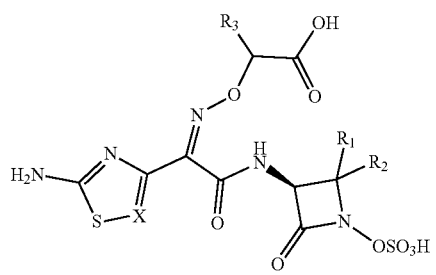

wherein,
R$_1$ and R$_2$, independently of one another, represent a hydrogen atom, methyl or ethyl;
R$_3$ represents ethyl, isopropyl, phenyl, or C3-6 cycloalkyl; and
X represents C or N.

[Form 5] The compound of the following general formula (I-1-3)

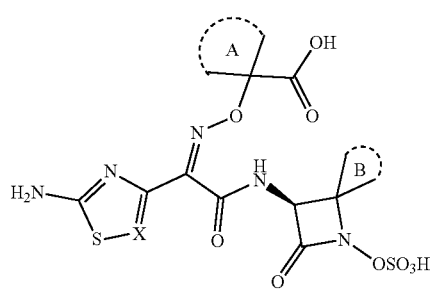

wherein,
ring A represents C3-6 cycloalkyl;
ring B represents C3-6 cycloalkyl; and
X represents C or N.

[Form 6] The compound of the following general formula (A)

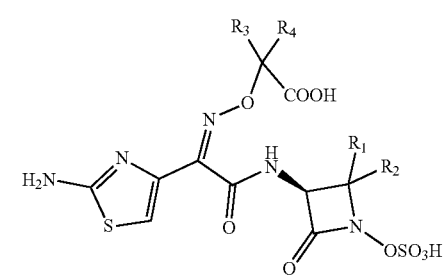

wherein,
R1 and R2, independently of one another, represent a hydrogen atom or an optionally substituted linear or branched C1-10 alkyl; or
R1 and R2 together form a C3-8 cycloalkyl;
R$_3$ and R$_4$, independently of one another, represent a hydrogen atom, an optionally substituted linear or branched C1-10 alkyl, or an optionally substituted C6-12 aryl; or
R$_3$ and R$_4$ together form a C3-8 cycloalkyl.

[Form 7] The compound of the following general formula (B)

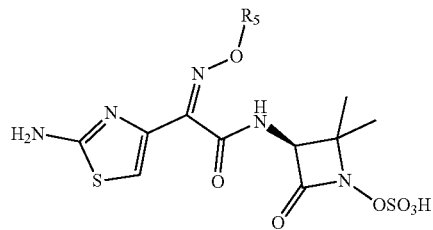

wherein,
R$_5$ represents an optionally substituted C3-7 alkenyl or alkynyl.

[Form 8] The compounds of the following formulae:

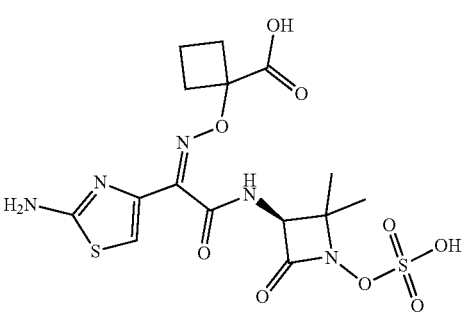

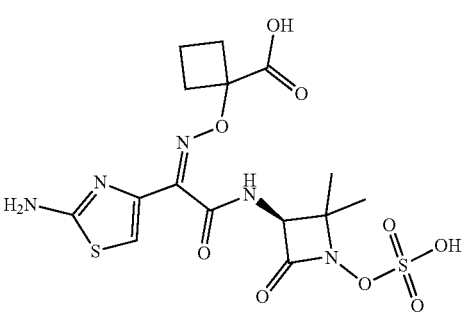

(A-4)
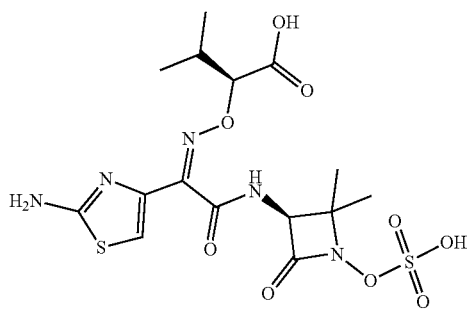

(A-5)
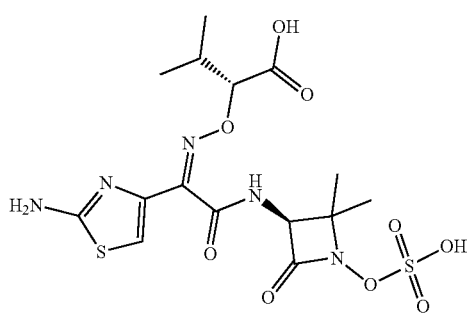

(A-6)
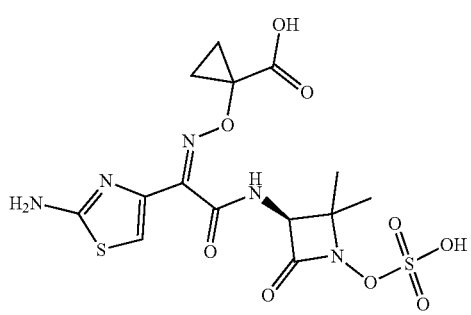

(A-7)
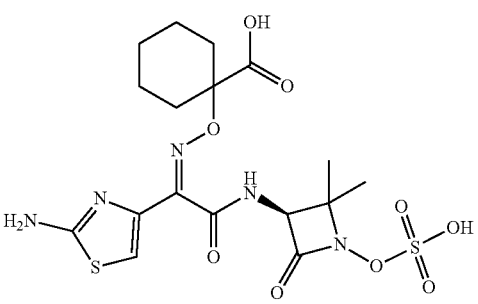

(B-1)
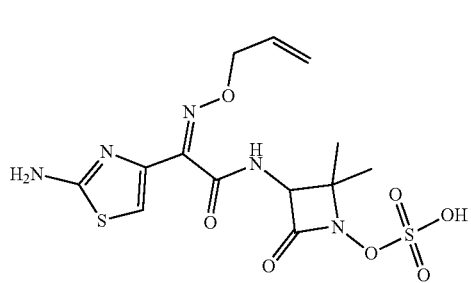

(B-2)
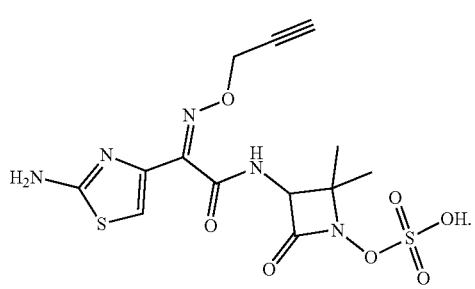

In another aspect, the present invention provides a method for preparing the compound of the general formula (I) below, comprising:
 step a of
  reacting a compound of formula (1) with a compound of formula (2) to obtain a compound of formula (3):

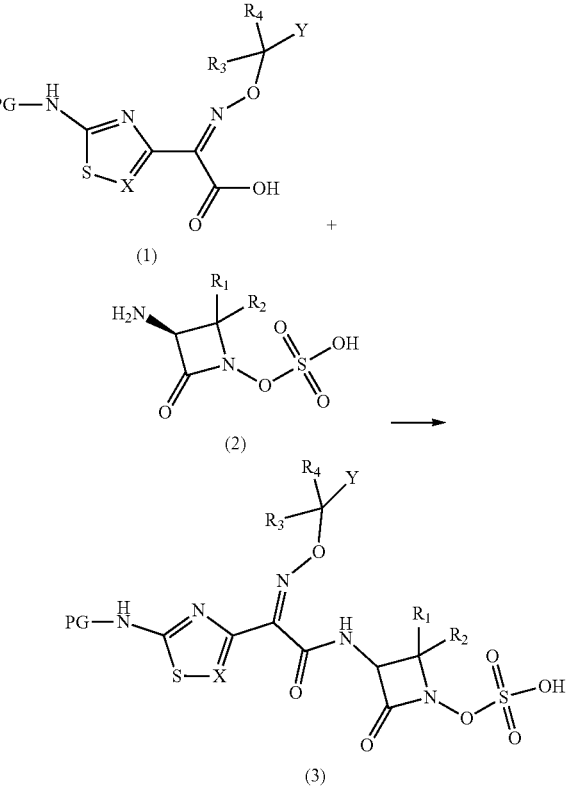

wherein,
 PG represents a protecting group;
 R1 and R2, independently of one another, represent a hydrogen atom or an optionally substituted linear or branched C1-10 alkyl; or
 R1 and R2 together form a C3-8 cycloalkyl;
 $R_3$ and $R_4$, independently of one another, represent a hydrogen atom, an optionally substituted linear or branched C1-10 alkyl, or an optionally substituted C6-12 aryl; or
 $R_3$ and $R_4$ together form a C3-8 cycloalkyl;
 X represents C or N; and
 Y represents an optionally substituted linear or branched C2-6 alkenyl or alkynyl, or carboxyl; and step b of
removing the protecting group by reacting the compound of formula (3) with trifluoroacetic acid and triethylsilane to obtain the compound of the general formula (I)

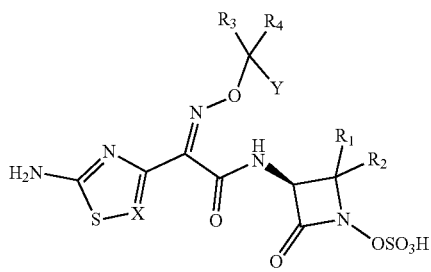

(1)

wherein,
$R_1$, $R_2$, $R_3$, $R_4$, X and Y are as defined above.

Forms of the method for preparing the compound of the general formula (I) according to the present invention can be listed below:

[Form I]
A method for preparing the compound of the general formula (A) by the following synthesis route:

wherein,
$R_1$ and $R_2$, independently of one another, represent a hydrogen atom or an optionally substituted linear or branched C1-10 alkyl; or
$R_1$ and $R_2$ together form a C3-8 cycloalkyl;
$R_3$ and $R_4$, independently of one another, represent a hydrogen atom, an optionally substituted linear or branched C1-10 alkyl, or an optionally substituted C6-12 aryl; or
$R_3$ and $R_4$ together form a $C_{3-8}$ cycloalkyl; and
PG1 and PG2 represent protecting groups.

In the above step 1a, compound 7a is dissolved in a solvent; triethylamine is added; and triphenylchloromethane are added in batches. The mixture is reacted at room temperature until the reaction is completed to obtain an intermediate compound 7b.

The organic solvent that can be used in the reaction of the above step 1a includes, for example, dichloromethane, chloroform, toluene, tetrahydrofuran, N,N-dimethylformamide, acetonitrile, methanol, ethanol, isopropanol or a mixture thereof.

In the above step 1b, compound 7b is dissolved in 1,4-dioxane/water (50:50), and sodium hydroxide is added. The mixture is reacted under continuous stirring until the starting materials disappear. 1,4-dioxane is removed by evaporation under reduced pressure. The solution is adjusted

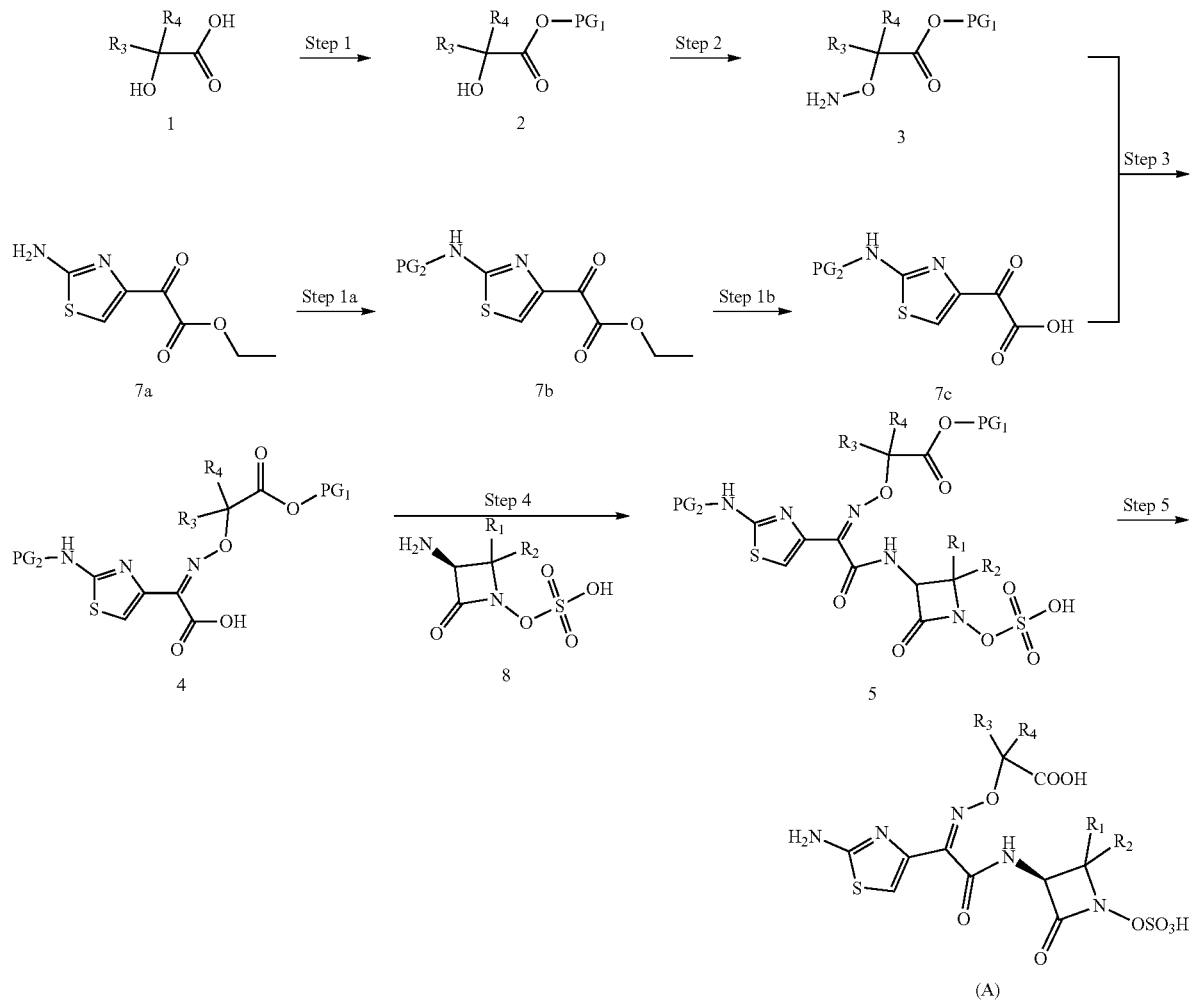

to pH 2-3, and stirred and filtered. The filter cake is washed with water until the filtrate is neutral. The filter cake is collected and dried to obtain compound 7c.

In the above step 1, compound 1 and diphenylbromomethane are dispersed in an organic solvent and stirred at room temperature. DBU (1,8-diazabicyclo-undec-7-ene) is added. The mixture is heated to 70-80° C., and reacted under stirring until the starting materials are not further reduced, and cooled to room temperature. The reaction solution is extracted. The organic phases are combined, dried, and concentrated. The residue is purified by column chromatography to obtain compound 2.

The organic solvent that can be used in the reaction of the above step 1 includes, for example, dichloromethane, toluene, tetrahydrofuran, and N,N-dimethylformamide.

In the above step 2, compound 2 and diphenylphosphoryl hydroxylamine are dispersed in an organic solvent, purged with nitrogen 3-4 times, and stirred at 0° C. Subsequently, sodium tert-butoxide is added. The mixture is reacted under stirring at constant temperature until the reactants are completely converted. The reaction solution is added with a saturated sodium chloride solution, stirred and filtered to remove insoluble substances to obtain compound 3.

The organic solvent that can be used in the reaction of the above step 2 includes, for example, dichloromethane, toluene, tetrahydrofuran, and N,N-dimethylformamide.

In the above step 3, compound 7c is dispersed in an organic solvent; and compound 3 in methanol is added under stirring at room temperature. The mixture is reacted under stirring at constant temperature until the starting materials are completely converted. The residue is purified by column chromatography to obtain compound 4.

The organic solvent that can be used in the reaction of the above step 3 includes, for example, methanol, ethanol, isopropanol, and N,N-dimethylformamide.

In the above step 4, compound 4 is dispersed in an organic solvent. HATU (2-(7-benzotriazol oxide)-N,N,N',N'-tetramethyluronium hexafluorophosphate), NaHCO$_3$, and compound 8 are added, respectively. The mixture is reacted under stirring at room temperature until the starting materials are completely converted. The residue is purified by column chromatography to obtain compound 5.

The organic solvent that can be used in the reaction of the above step 4 includes, for example, dichloromethane, toluene, tetrahydrofuran, and N,N-dimethylformamide.

In the above step 5, compound 5 is dissolved in an organic solvent and stirred at −5 to −10° C. Triethylsilane and trifluoroacetic acid are added therein. The mixture is reacted at constant temperature until the reaction is completed. The solvent is removed by evaporation under reduced pressure at room temperature. The residue is purified to obtain the compound of the general formula (A) as the target product.

The organic solvent that can be used in the reaction of the above step 5 includes, for example, anhydrous dichloromethane, toluene, tetrahydrofuran, and N,N-dimethylformamide.

[Form II]

A method for preparing the compound of the general formula (A) by the following synthesis route:

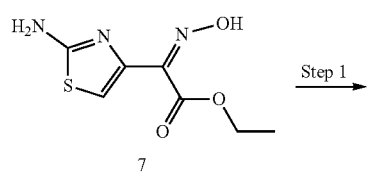

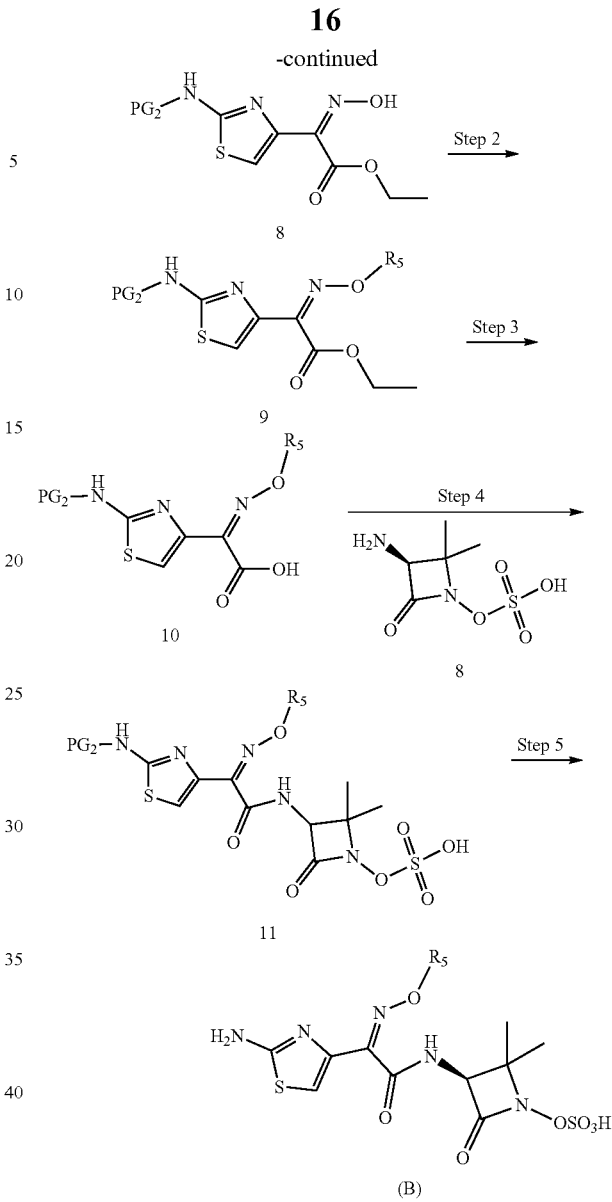

wherein,

R$_5$ represents an optionally substituted C3-7 alkenyl or alkynyl; and

PG2 represents a protecting group.

In the above step 1, compound 7 is dissolved in an organic solvent; triethylamine is added; and triphenylchloromethane is added in batches. The mixture is reacted under stirring at room temperature until the reaction is completed, and then extracted, dried, and concentrated to obtain compound 8.

The organic solvent that can be used in the reaction of the above step 1 includes, for example, dichloromethane, toluene, tetrahydrofuran, and N,N-dimethylformamide.

In the above step 2, compound 8 is dissolved in an organic solvent. K$_2$CO$_3$ and allyl bromide are added successively. The mixture is reacted under stirring at room temperature until the reaction is completed, and then extracted, dried, and concentrated to obtain compound 9.

The organic solvent that can be used in the reaction of the above step 2 includes, for example, dichloromethane, toluene, tetrahydrofuran, and N,N-dimethylformamide.

In the above step 3, compound 9 is dissolved in 1,4-dioxane/water (50:50) and stirred at room temperature, and sodium hydroxide is added. The mixture is reacted under continuous stirring until the starting materials disappear. 1,4-dioxane is removed by evaporation under reduced pressure. The solution is adjusted to pH 2-3, stirred, filtered, and washed with water until the filtrate is neutral to obtain compound 10.

In the above step 4, compound 10 is dispersed in an organic solvent. HATU (2-(7-benzotriazol oxide)-N,N,N', N'-tetramethyluronium hexafluorophosphate), $NaHCO_3$, and compound 8 are added, respectively. The mixture is reacted under stirring at room temperature until the starting materials are completely converted, and then is purified by column chromatography to obtain compound 11.

The organic solvent that can be used in the reaction of the above step 4 includes, for example, dichloromethane, toluene, tetrahydrofuran, and N,N-dimethylformamide.

In the above step 5, compound 11 is dissolved in an organic solvent and stirred at −5 to −10° C. Triethylsilane and trifluoroacetic acid are added therein. The mixture is reacted at constant temperature until the reaction is completed. The solvent is removed by evaporation under reduced pressure at room temperature. The residue is purified to obtain the compound of the general formula (B) as the target product.

The organic solvent that can be used in the reaction of the above step 5 includes, for example, anhydrous dichloromethane, toluene, tetrahydrofuran, and N,N-dimethylformamide.

In a further aspect, the present invention provides use of the compound of the general formula (I) or the salt thereof in the manufacture of an antibacterial agent against Gram-negative bacteria.

Next, examples of the compounds according to the present invention are specifically described as follows:

the compounds of the general formula (I) in which $R_1$ to $R_4$ are all hydrogen atoms; Y is carboxyl; and X is C atom;

the compounds of the general formula (I) in which $R_1$ to $R_4$ are all methyl; Y is carboxyl; and X is C atom;

the compounds of the general formula (I) in which $R_1$ and $R_2$ are both methyl; $R_3$ and $R_4$ are ethyl; Y is carboxyl; and X is C atom;

the compounds of the general formula (I) in which $R_1$ and $R_2$ are both methyl; $R_3$ is a hydrogen atom; $R_4$ is propyl; Y is carboxyl; and X is C atom;

the compounds of the general formula (I) in which $R_1$ and $R_2$ are both methyl; $R_3$ is a hydrogen atom; $R_4$ is butyl; Y is carboxyl; and X is C atom;

the compounds of the general formula (I) in which $R_1$ and $R_2$ are both methyl; $R_3$ and $R_4$ are both propyl; Y is carboxyl; and X is C atom;

the compounds of the general formula (I) in which $R_1$ and $R_2$ are both methyl; $R_3$ and $R_4$ are both butyl; Y is carboxyl; and X is C atom;

the compounds of the general formula (I) in which $R_1$ and $R_2$ are both methyl; $R_3$ and $R_4$ are both pentyl; Y is carboxyl; and X is C atom;

the compounds of the general formula (I) in which $R_1$ and $R_2$ are both methyl; $R_3$ and $R_4$ are both hexyl; Y is carboxyl; and X is C atom;

the compounds of the general formula (I) in which $R_1$ and $R_2$ are both methyl; $R_3$ and $R_4$ together form cyclopropyl; Y is carboxyl; and X is C atom;

the compounds of the general formula (I) in which $R_1$ and $R_2$ are both methyl; $R_3$ and $R_4$ together form cyclobutyl; Y is carboxyl; and X is C atom;

the compounds of the general formula (I) in which $R_1$ and $R_2$ are both methyl; $R_3$ and $R_4$ together form cyclopentyl; Y is carboxyl; and X is C atom;

the compounds of the general formula (I) in which $R_1$ and $R_2$ are both methyl; $R_3$ and $R_4$ together form cyclohexyl; Y is carboxyl; and X is C atom;

the compounds of the general formula (I) in which $R_1$ and $R_2$ are both methyl; $R_3$ and $R_4$ together form cycloheptyl; Y is carboxyl; and X is C atom;

the compounds of the general formula (I) in which $R_1$ and $R_2$ are methyl; $R_3$ and $R_4$ together form cyclooctyl; Y is carboxyl; and X is C atom;

the compounds of the general formula (I) in which $R_1$ and $R_2$ are both methyl; $R_3$ is ethyl; $R_4$ is a hydrogen atom; Y is carboxyl; and X is C atom;

the compounds of the general formula (I) in which $R_1$ and $R_2$ are both methyl; $R_3$ is isopropyl; $R_4$ is a hydrogen atom; Y is carboxyl; and X is C atom;

the compounds of the general formula (I) in which $R_1$ and $R_2$ are both methyl; $R_3$ is phenyl; $R_4$ is a hydrogen atom; Y is carboxyl; and X is C atom;

the compounds of the general formula (I) in which $R_1$ and $R_2$ are both methyl; $R_3$ is cyclopropyl; $R_4$ is a hydrogen atom; Y is carboxyl; and X is C atom;

the compounds of the general formula (I) in which $R_1$ and $R_2$ are both methyl; $R_3$ is cyclobutyl; $R_4$ is a hydrogen atom; Y is carboxyl; and X is C atom;

the compounds of the general formula (I) in which $R_1$ and $R_2$ are both methyl; $R_3$ is cyclopentyl; $R_4$ is a hydrogen atom; Y is carboxyl; and X is C atom;

the compounds of the general formula (I) in which $R_1$ and $R_2$ are both methyl; $R_3$ is cyclohexyl; $R_4$ is a hydrogen atom; Y is carboxyl; and X is C atom;

the compounds of the general formula (I) in which $R_1$ is a hydrogen atom; $R_2$ is ethyl; $R_3$ and $R_4$ together form cyclopropyl; Y is carboxyl; and X is C atom;

the compounds of the general formula (I) in which $R_1$ is a hydrogen atom; $R_2$ is ethyl; $R_3$ and $R_4$ together form cyclobutyl; Y is carboxyl; and X is C atom;

the compounds of the general formula (I) in which $R_1$ is a hydrogen atom; $R_2$ is ethyl; $R_3$ and $R_4$ together form cyclopentyl; Y is carboxyl; and X is C atom;

the compounds of the general formula (I) in which $R_1$ is a hydrogen atom; $R_2$ is ethyl; $R_3$ and $R_4$ together form cyclohexyl; Y is carboxyl; and X is C atom;

the compounds of the general formula (I) in which $R_1$ and $R_2$ are both ethyl; $R_3$ and $R_4$ together form cyclopropyl; Y is carboxyl; and X is C atom;

the compounds of the general formula (I) in which $R_1$ and $R_2$ are both ethyl; $R_3$ and $R_4$ together form cyclobutyl; Y is carboxyl; and X is C atom;

the compounds of the general formula (I) in which $R_1$ and $R_2$ are both ethyl; $R_3$ and $R_4$ together form cyclopentyl; Y is carboxyl; and X is C atom;

the compounds of the general formula (I) in which $R_1$ and $R_2$ are both ethyl; $R_3$ and $R_4$ together form cyclohexyl; Y is carboxyl; and X is C atom;

the compounds of the general formula (I) in which $R_1$ and $R_2$ are both methyl; $R_3$ and $R_4$ together form cyclopropyl; Y is carboxyl; and X is N atom;

the compounds of the general formula (I) in which $R_1$ and $R_2$ are both methyl; $R_3$ and $R_4$ together form cyclobutyl; Y is carboxyl; and X is N atom;

the compounds of the general formula (I) in which $R_1$ and $R_2$ are both methyl; $R_3$ and $R_4$ together form cyclopentyl; Y is carboxyl; and X is N atom;

the compounds of the general formula (I) in which $R_1$ and $R_2$ are both methyl; $R_3$ and $R_4$ together form cyclohexyl; Y is carboxyl; and X is N atom;

the compounds of the general formula (I) in which $R_1$ and $R_2$ are both ethyl; $R_3$ and $R_4$ together form cyclopropyl; Y is carboxyl; and X is N atom;

the compounds of the general formula (I) in which $R_1$ and $R_2$ are both ethyl; $R_3$ and $R_4$ together form cyclobutyl; Y is carboxyl; and X is N atom;

the compounds of the general formula (I) in which $R_1$ and $R_2$ are both ethyl; $R_3$ and $R_4$ together form cyclopentyl; Y is carboxyl; and X is N atom;

the compounds of the general formula (I) in which $R_1$ and $R_2$ are both ethyl; $R_3$ and $R_4$ together form cyclohexyl; Y is carboxyl; and X is N atom;

the compounds of the general formula (I-2) in which $R_5$ is allyl; and X is C atom;

the compounds of the general formula (I-2) in which $R_5$ is propargyl; and X is C atom;

the compounds of the general formula (I-2) in which $R_5$ is butenyl; and X is C atom;

the compounds of the general formula (I-2) in which $R_5$ is butynyl; and X is C atom;

the compounds of the general formula (I-2) in which $R_5$ is allyl; and X is N;

the compounds of the general formula (I-2) in which $R_5$ is propargyl; and X is N;

the compounds of the general formula (I-2) in which $R_5$ is butenyl; and X is N;

the compounds of the general formula (I-2) in which $R_5$ is allyl; and X is N; and the like.

The compounds according to the present invention are not limited to the examples of compounds as listed above.

The term "pharmaceutically acceptable salt" used herein refers to salts which ensure the biological potency of the compounds of the present invention per se and typically do not possess undesirable properties, biologically or otherwise. In many cases, the compounds of the present invention are capable of forming acid and/or base salts in the presence of amino and/or carboxyl or other similar groups.

The pharmaceutically acceptable salt comprises inorganic and organic salts.

The inorganic bases that can form inorganic salts with the compound of the present invention include, for example, sodium hydroxide, potassium hydroxide, calcium hydroxide, magnesium hydroxide, ammonia, and the like.

The inorganic acids that can form inorganic salts with the compound of the present invention include, for example, hydrochloric acid, hydrobromic acid, sulfuric acid, nitric acid, phosphoric acid, and the like.

The organic bases that can form organic salts with the compound of the present invention include, for example, primary amine, secondary amine, tertiary amine, ethylenediamine, propylenediamine, butylenediamine, benzylamine, phenethylamine, and the like.

The organic acids that can form organic salts with the compound of the present invention include, for example, formic acid, acetic acid, propionic acid, oxalic acid, citric acid, benzoic acid, and the like.

EXAMPLES

Hereinafter, the present invention will be described in more detail by reference to preparation examples and test examples. However, the present invention is not limited thereto.

The specific synthetic route of compounds (A-1) to (A-7) is shown as follows:

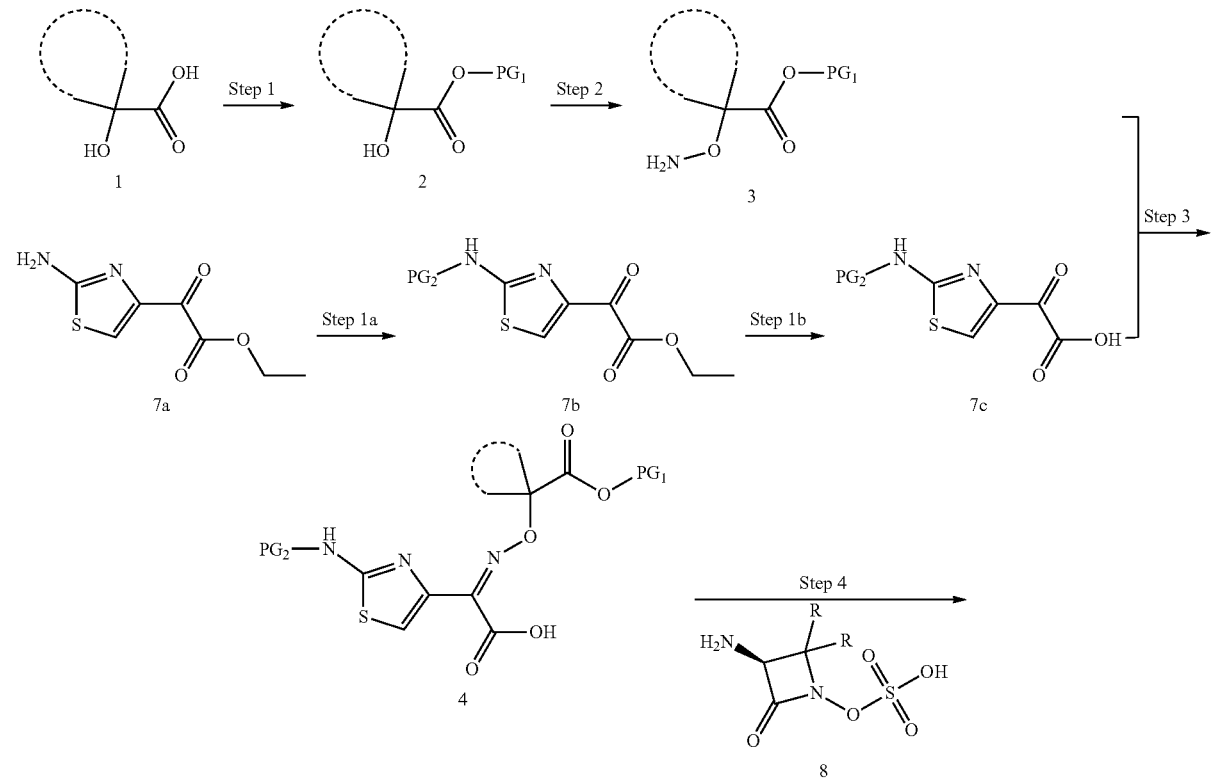

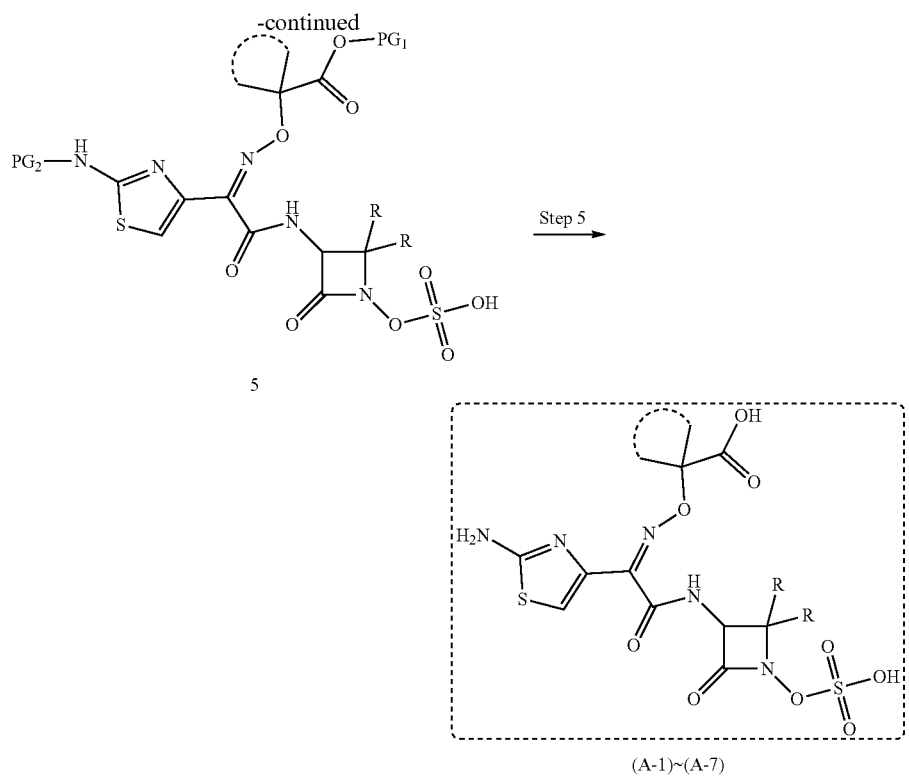

PREPARATION EXAMPLES

Preparation Example 1: Synthesis of Compound (A-1)

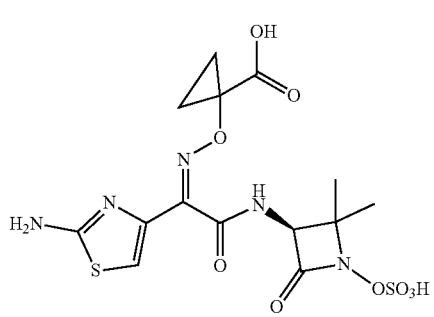

(A-1)

Step 1a: Compound 7a (1.0 mmol) was dissolved in DMF (10.0 v/g); triethylamine (2.0 mmol) was added; and triphenylchloromethane (1.2 mmol) was added in batches. The mixture was reacted under stirring at room temperature for 6 hours until the reaction was completed as monitored by TLC, and then extracted with water/ethyl acetate. The organic phases were combined, dried, and concentrated. The residue was purified by column chromatography to obtain the target compound 7b.

Step 1b: Compound 7b (1.0 mmol) was dissolved in 1,4-dioxane (5 v/g)/water (5 v/g), and stirred at room temperature, and sodium hydroxide (5.0 mmol) was added. The mixture was reacted under continuous stirring until the starting materials disappeared as monitored by TLC. 1,4-dioxane was removed by evaporation under reduced pressure. The solution was adjusted to pH 2-3, stirred for 10 minutes, filtered, and washed with water until the filtrate was neutral. The filter cake was collected and dried to obtain compound 7c.

Step 1: Compound 1a

(1.0 mmol) and diphenylbromomethane (1.1 mmol) were dispersed in toluene (10.0 v/g) and stirred at room temperature. DBU (1.5 mmol) was added. The mixture was heated to 70-80° C., reacted under stirring for 12-16 hours until the starting materials were not further reduced as monitored by TLC, and cooled to room temperature. The reaction solution was extracted with the addition of water (10.0 v/g×2), and the aqueous phase was in turn washed with ethyl acetate (10 v/g×2). The organic phases were combined, dried, and concentrated. The residue was purified by column chromatography to obtain compound 2a as translucent oil (and later solidified) [$^1$H NMR (400 MHz, CDCl$_3$) δ (ppm) 7.42-7.31 (m, 10H), 6.96 (s, 1H), 1.44 (dd, J=8.1, 4.9 Hz, 2H), 1.25 (dd, J=8.1, 4.9 Hz, 2H)].

Step 2: Compound 2a (1.0 mmol) and diphenylphosphoryl hydroxylamine (1.1 mmol) were dispersed in an anhydrous tetrahydrofuran solution (10.0 v/g), purged with nitrogen 3-4 times, and stirred at 0° C. Subsequently, sodium tert-butoxide (1.5 mmol) was added. The mixture was reacted under stirring at constant temperature for 1-2 hours until the reactants were completely converted as monitored by TLC. The reaction solution was added with a saturated sodium chloride solution (5.0 v/g), stirred for 30 minutes and filtered to remove the insoluble substances. The filter cake was washed with ethyl acetate. The filtrate was added with ethyl acetate (10.0 v/g) and water (5.0 v/g), and partitioned. The organic phase was washed with water once. The aqueous phases were combined and in turn washed with ethyl acetate. The organic phases were combined, dried and concentrated to obtain compound 3a as oil [$^1$H NMR (600 MHz, DMSO) δ(ppm) 7.46-7.27 (m, 10H), 6.84 (s, 1H), 6.36 (s, 2H), 1.30-1.22 (m, 4H)].

Step 3: Compound 7c was dispersed in methanol (10.0 v/g). Compound 3a in methanol was added under stirring at room temperature. The mixture was reacted under stirring at constant temperature for 30 minutes until the starting materials were completely converted as monitored by TLC. The solvent was removed by evaporation under reduced pressure. The residue was isolated by column chromatography to obtain compound 4a as off-white solid [$^1$H NMR (600 MHz, DMSO) δ(ppm) 8.84 (s, 1H), 7.51-7.15 (m, 25H), 6.86 (s, 2H), 1.48-1.28 (m, 4H)].

Step 4: Compound 4a (1.0 mmol) was dissolved in DMF (10.0 v/g). HATU (1.2 mmol), NaHCO$_3$ (2.0 mmol) and compound 8 (1.3 mmol) were added under stirring at room temperature, respectively. The mixture was reacted under continuous stirring at constant temperature for 12 hours until the starting materials disappeared as monitored. The solution was diluted with ethyl acetate (10.0 v/g), and washed twice with water. The aqueous phase was in turn washed with ethyl acetate once. The organic phases were combined, dried, and concentrated. The residue was purified by column chromatography to obtain compound 5a as off-white foamy solid [$^1$H NMR (600 MHz, DMSO) δ(ppm) 9.29 (d, J=7.9 Hz, 1H), 8.91 (s, 1H), 7.45-7.43 (m, 3H), 7.36-7.33 (m, 6H), 7.32-7.22 (m, 15H), 6.86 (s, 1H), 6.76 (d, J=0.5 Hz, 1H), 4.56 (d, J=7.9 Hz, 1H), 1.50-1.40 (m, 5H), 1.30 (m, 2H), 1.20 (s, 2H)].

Step 5: the above white solid 5a (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and filtered. The filter cake was further washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-1).

$^1$H NMR (600 MHz, DMSO) δ(ppm) 9.40 (d, J=7.9 Hz, 1H), 6.89 (s, 1H), 4.62 (d, J=8.0 Hz, 1H), 1.44 (s, 3H), 1.36 (m, 4H), 1.25 (s, 3H). $^{13}$C NMR (151 MHz, DMSO) δ(ppm) 173.7, 169.8, 161.9, 111.6, 68.3, 63.3, 61.3, 60.2, 23.8, 21.0, 16.2. $^{13}$C NMR (151 MHz, DMSO) δ 173.7, 169.8, 161.9, 111.6, 68.3, 63.3, 61.3, 60.2, 23.8, 21.0, 16.2. HRMS: cacled for C$_{14}$H$_{17}$N$_5$O$_9$S$_2$ [M-H] 462.0396, found 462.0394.

Preparation Example 2: Synthesis of Compound (A-2)

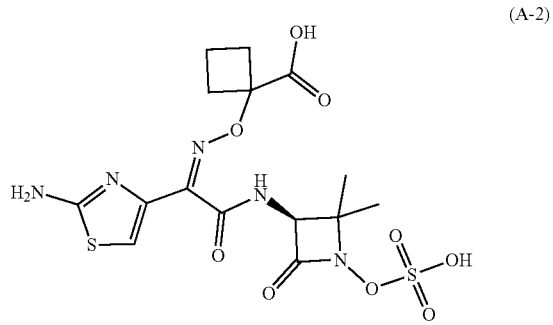 [SMILES: CC1(C)[C@H](NC(=O)/C(=N\OC2(C(=O)O)CCC2)c2csc(N)n2)C(=O)N1OS(=O)(=O)O]

For the method for synthesizing Compound (A-2), please refer to the synthesis of Compound (A-1)).

2b: $^1$H NMR (600 MHz, DMSO) δ(ppm) 7.44 (d, J=7.4 Hz, 4H), 7.37 (t, J=7.6 Hz, 4H), 7.29 (t, J=7.3 Hz, 2H), 6.83 (s, 1H), 5.87 (s, 1H), 2.47-2.40 (m, 2H), 2.16-2.07 (m, 2H), 1.89-1.74 (m, 2H);

3b: $^1$H NMR (600 MHz, DMSO) δ(ppm) 7.35 (ddd, J=46.9, 31.4, 7.3 Hz, 10H), 6.85 (s, 1H), 6.11 (s, 2H), 2.35 (ddd, J=13.4, 7.2, 3.7 Hz, 2H), 2.22-2.09 (m, 2H), 1.92-1.74 (m, 2H);

4b: $^1$H NMR (600 MHz, DMSO) δ(ppm) 8.58 (s, 1H), 7.50-7.15 (m, 25H), 6.78 (s, 1H), 6.12 (s, 1H), 2.42 (s, 2H), 2.25-2.22 (m, 2H), 1.96-1.69 (m, 2H). (Containing 50% impurities, see Z21e);

(A-2): 1H NMR (600 MHz, DMSO) δ(ppm) 9.56 (d, J=7.3 Hz, 1H), 6.89 (s, 1H), 4.66 (d, J=7.8 Hz, 1H), 2.45 (s, 2H), 2.35-2.19 (m, 2H), 1.99-1.79 (m, 2H), 1.46 (s, 3H), 1.32 (s, 3H). $^{13}$C NMR (151 MHz, DMSO) δ(ppm) 173.6, 170.3, 161.8, 129.5, 128.8, 126.7, 111.5, 83.7, 68.4, 61.4, 30.6, 30.5, 23.7, 21.0, 13.9. HRMS: cacled for C$_{15}$H$_{19}$N$_5$O$_9$S$_2$ [M+Na] 500.0516, found 500.0500.

Preparation Example 3: Synthesis of Compound (A-3)

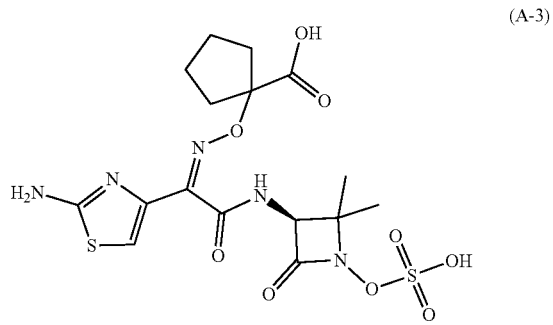 [SMILES: CC1(C)[C@H](NC(=O)/C(=N\OC2(C(=O)O)CCCC2)c2csc(N)n2)C(=O)N1OS(=O)(=O)O]

Step 1: Compound 1c

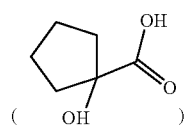

(1.0 mmol) and diphenylbromomethane (1.1 mmol) were dispersed in toluene (10.0 v/g). DBU (1.5 mmol) was added. The mixture was heated to 70-80° C., and reacted under stirring for 12-16 hours until the starting materials were not further reduced as monitored by TLC, and then cooled to room temperature. The reaction solution was extracted with the addition of water (10.0 v/g×2). The aqueous layer was in turn washed with ethyl acetate (10 v/g×2). The organic phases were combined, dried, and concentrated. The residue was purified by column chromatography to obtain compound 2c as translucent oil (and later solidified) [$^1$H NMR (600 MHz, DMSO) δ(ppm) 7.45-7.24 (m, 10H), 6.80 (s, 1H), 5.27 (s, 1H), 2.03-1.91 (m, 2H), 1.79-1.63 (m, 6H)].

Step 2: Compound 2c (1.0 mmol) and diphenylphosphoryl hydroxylamine (1.1 mmol) were dispersed in anhydrous tetrahydrofuran solution (10.0 v/g), purged with nitrogen 3-4 times, and then stirred at 0° C. Sodium tert-butoxide (1.5 mmol) was added. The mixture was reacted under stirring at constant temperature for 1 to 2 hours until the reactants were completely converted as monitored by TLC. The reaction solution was added with a saturated sodium chloride solution (5.0 v/g), stirred for 30 minutes and filtered to remove insoluble substances. The filter cake was washed with ethyl acetate. The filtrate was added with ethyl acetate (10.0 v/g) and water (5.0 v/g), and partitioned. The organic phase was washed with water once. The aqueous phases were combined and in turn washed with ethyl acetate. The organic phases were combined, dried and concentrated to obtain compound 3c as oil, which was directly used in the subsequent reaction without further purification.

Step 3: Compound 7c was dispersed in methanol (10.0 v/g). Compound 3c in methanol was added under stirring at room temperature. The mixture was reacted under stirring at constant temperature for 30 minutes until the starting materials were completely converted as monitored by TLC. The solvent was removed by evaporation under reduced pressure. The residue was purified by column chromatography to obtain compound 4c as off-white solid [$^1$H NMR (600 MHz, DMSO) δ(ppm) 8.86 (s, 1H), 7.50-7.17 (m, 25H), 6.80 (s, 1H), 6.78 (s, 1H), 2.11-1.94 (m, 4H), 1.69-1.68 (d, 4H)].

Step 4: Compound 4c (1.0 mmol) was dissolved in DMF (10.0 v/g) and stirred at room temperature. HATU (1.2 mmol), NaHCO$_3$ (2.0 mmol), and compound 8 (1.3 mmol) were added, respectively. The mixture was reacted under continuous stirring at constant temperature for 12 hours until the starting materials disappeared as monitored. The mixture was diluted with ethyl acetate (10.0 v/g), and washed twice with water. The aqueous phase was in turn washed with ethyl acetate once. The organic phases were combined, dried, and concentrated. The residue was purified by column chromatography to obtain compound 5c as off-white foamy solid [$^1$H NMR (600 MHz, DMSO) δ(ppm) 9.35 (d, J=7.6 Hz, 1H), 8.88 (s, 1H), 7.48-7.17 (m, 25H), 6.80 (s, 1H), 6.68 (s, 1H), 4.57 (d, J=7.7 Hz, 1H), 2.16-1.90 (m, 4H), 1.81-1.57 (m, 4H), 1.45 (s, 3H), 1.27 (s, 3H)].

Step 5: The above white solid 5c (1.0 mmol) was dissolved in anhydrous dichloromethane (10.0 v/g) and stirred at −5 to −10° C. Triethylsilane (2.0 mmol) and trifluoroacetic acid (100.0 mmol) were added. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and filtered. The filter cake was further washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-3).

$^1$H NMR (600 MHz, DMSO) δ(ppm) 9.51 (d, J=7.6 Hz, 1H), 6.86 (s, 1H), 4.63 (d, J=7.7 Hz, 1H), 2.09-1.97 (m, 4H), 1.73-1.64 (m, 4H), 1.46 (s, 3H), 1.29 (s, 3H). $^{13}$C NMR (151 MHz, DMSO) δ(ppm) 174.83, 163.48, 161.82, 149.85, 140.60, 110.92, 92.84, 68.28, 61.44, 35.83, 24.64, 24.51, 23.75, 20.91. HRMS: cacled for C$_{16}$H$_{21}$N$_5$O$_9$S$_2$ [M-H] 490.0708, found 490.0700.

Preparation Example: Synthesis of Compound (A-4)

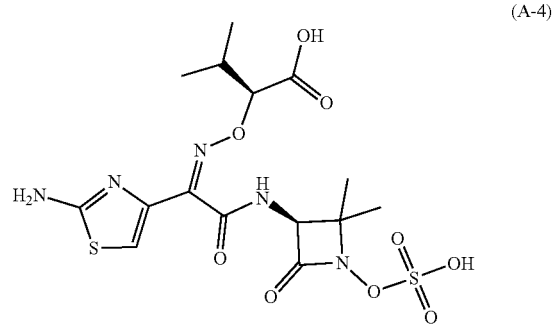 [SMILES: CC(C)[C@H](O/N=C(\C(=O)N[C@@H]1C(=O)N(OS(=O)(=O)O)C1(C)C)c1csc(N)n1)C(=O)O]

(A-4)

Step 1: Compound 1d

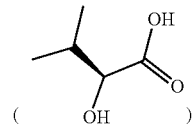

(1.0 mmol) and diphenylbromomethane (1.1 mmol) were dispersed in toluene (10.0 v/g) and stirred at room temperature. DBU (1.5 mmol) was added. The mixture was heated to 70-80° C. and reacted under stirring for 12-16 hours until the starting materials were not further reduced as monitored by TLC, and cooled to room temperature. The reaction solution was extracted with the addition of water (10.0 v/g×2). The aqueous layer was in turn washed with ethyl acetate (10 v/g×2). The organic phases were combined, dried, and concentrated. The residue was purified by column chromatography to obtain compound 2d as translucent oil (and later solidified) [[ca]-27.0 (c 0.10, MeOH); $^1$H NMR (600 MHz, DMSO) δ(ppm) 7.44-7.26 (m, 10H), 6.84 (s, 1H), 5.37 (d, J=6.0 Hz, 1H), 3.95 (dd, J=5.8, 5.2 Hz, 1H), 2.07-1.95 (m, 1H), 0.86 (d, J=6.9 Hz, 3H), 0.78 (d, J=6.8 Hz, 3H)].

Step 2: Compound 2d (1.0 mmol) and diphenylphosphoryl hydroxylamine (1.1 mmol) were dispersed in anhydrous tetrahydrofuran solution (10.0 v/g), purged with nitrogen 3-4 times, and stirred at 0° C. Subsequently, sodium tert-butoxide (1.5 mmol) was added. The mixture was reacted under stirring at constant temperature for 1 to 2 hours until the reactants were completely converted as monitored by TLC. The reaction solution was added with a saturated sodium chloride solution (5.0 v/g), stirred for 30 minutes and filtered to remove insoluble substances. The filter cake was washed with ethyl acetate. The filtrate was added with ethyl acetate (10.0 v/g) and water (5.0 v/g), and partitioned. The organic phase was washed with water once. The aqueous phases were combined and in turn washed with ethyl acetate. The organic phases were combined, dried and concentrated to obtain compound 3d as oil [[α]$_D^{25}$ −59.0 (c 0.10, MeOH); $^1$H NMR (600 MHz, CDCl$_3$) δ 7.37-7.26 (m, 10H), 7.00 (s, 1H), 4.11 (d, J=5.3 Hz, 1H), 2.11-2.06 (m, 1H), 0.92 (d, J=6.9 Hz, 3H), 0.87 (d, J=6.9 Hz, 3H)].

Step 3: Compound 7c was dispersed in methanol (10.0 v/g). Compound 3d in methanol was added under stirring at room temperature. The mixture was reacted under stirring at constant temperature for 30 minutes until the starting materials were completely converted as monitored by TLC. The solvent was removed by evaporation under reduced pressure. The residue was purified by column chromatography to obtain compound 4d as off-white solid [$^1$H NMR (600 MHz, DMSO) δ(ppm) 8.84 (s, 1H), 7.51-7.15 (m, 25H), 6.86 (s, 1H), 6.81 (s, 1H), 4.49 (d, J=5.9 Hz, 1H), 2.18-2.04 (m, 1H), 0.86 (dd, J=19.0, 6.7 Hz, 6H). Impurity $^1$H NMR (600 MHz, DMSO) δ(ppm) 8.82 (s, 1H), 7.48-7.11 (m, 25H), 6.81 (s, 1H), 6.27 (s, 1H)].

Step 4: Compound 4d (1.0 mmol) was dissolved in DMF (10.0 v/g) and stirred at room temperature. HATU (1.2 mmol), NaHCO$_3$ (2.0 mmol), and compound 8 (1.3 mmol) were added. The mixture was reacted under a continuous stirring at constant temperature for 12 hours until the starting materials disappeared as monitored. The solution was diluted with ethyl acetate (10.0 v/g), and washed twice with water. The aqueous phase was in turn washed with ethyl acetate once. The organic phases were combined, dried, and concentrated. The residue was purified by column chromatography to obtain compound 5d as off-white foamy solid, which was directly used in the next reaction step.

Step 5: The above white solid 5d (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and then filtered. The filter cake was washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-4).

$^1$H NMR (600 MHz, DMSO) δ(ppm) 9.58 (d, J=7.5 Hz, 1H), 6.89 (s, 1H), 4.65 (d, J=7.6 Hz, 1H), 4.37 (d, J=5.2 Hz, 1H), 2.13-2.07 (m, 1H), 1.45 (s, 3H), 1.30 (s, 3H), 1.00-0.86 (m, 6H). $^{13}$C NMR (151 MHz, DMSO) δ 172.2, 170.2, 164.4, 163.5, 161.8, 11.7, 111.4, 87.6, 68.1, 61.4, 30.1, 23.8, 21.1, 18.8, 18.2. HRMS: cacled for C$_{15}$H$_{21}$N$_5$O$_9$S$_2$ [M+Na] 502.0673, found 502.0677.

Preparation Example 5: Synthesis of Compound (A-5)

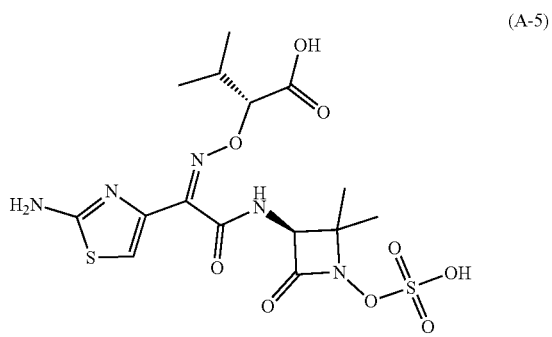 [SMILES: CC(C)[C@@H](O/N=C(\C(=O)N[C@@H]1C(=O)N(OS(=O)(=O)O)C1(C)C)c1csc(N)n1)C(=O)O]

Step 1: Compound 1e

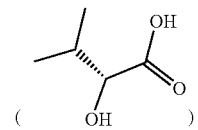

(1.0 mmol) and diphenylbromomethane (1.1 mmol) were dispersed in toluene (10.0 v/g). DBU (1.5 mmol) was added under stirring at room temperature. The mixture was heated to 70-80° C., reacted under stirring for 12-16 hours until the starting materials were not further reduced as monitored by TLC, and then cooled to room temperature. The reaction solution was extracted with the addition of water (10.0 v/g×2). The aqueous layer was in turn washed with ethyl acetate (10 v/g×2). The organic phases were combined, dried, and concentrated. The residue was purified by column chromatography to obtain compound 2e as translucent oil (post-curing) [$^1$H NMR (600 MHz, DMSO) δ(ppm) 7.43-7.26 (m, 10H), 6.84 (s, 1H), 5.37 (d, J=6.0 Hz, 1H), 3.95 (dd, J=5.9, 5.0 Hz, 1H), 2.07-1.98 (m, 1H), 0.86 (d, J=6.9 Hz, 3H), 0.78 (d, J=6.8 Hz, 3H)].

Step 2: Compound 2e (1.0 mmol) and diphenylphosphoryl hydroxylamine (1.1 mmol) were dispersed in anhydrous tetrahydrofuran solution (10.0 v/g), purged with nitrogen 3-4 times, and then stirred at 0° C. Subsequently, sodium tert-butoxide (1.5 mmol) was added. The mixture was reacted under stirring at constant temperature for 1 to 2 hours until the reactants were completely converted as monitored by TLC. The reaction solution was added with a saturated sodium chloride solution (5.0 v/g), stirred for 30 minutes and filtered to remove insoluble substances. The filter cake was washed with ethyl acetate. The filtrate was added with ethyl acetate (10.0 v/g) and water (5.0 v/g), and partitioned. The organic phase was washed with water once. The aqueous phases were combined and in turn washed with ethyl acetate. The organic phases were combined, dried and concentrated to obtain compound 3e as oil [$^1$H NMR (600 MHz, DMSO) δ(ppm) 7.43-7.40 (m, 4H), 7.37-7.34 (m, 4H), 7.31-7.27 (m, 2H), 6.89 (s, 1H), 6.20 (s, 2H), 3.94 (d, J=5.8 Hz, 1H), 1.95 (m, 1H), 0.82 (m, 6H)].

Step 3: Compound 7c was dispersed in methanol (10.0 v/g). Compound 3e in methanol was added under stirring at room temperature. The mixture was reacted under stirring at constant temperature for 30 minutes until the starting materials were completely converted as monitored by TLC. The solvent was removed by evaporation under reduced pressure. The residue was purified by column chromatography to obtain compound 4e as off-white solid [¹H NMR (600 MHz, DMSO) δ(ppm) 8.57 (s, 1H), 7.39-7.19 (m, 25H), 6.84 (s, 1H), 6.12 (s, 1H), 4.27 (d, J=5.8 Hz, 1H), 2.09-1.92 (m, 1H), 0.91-0.79 (m, 6H)].

Step 4: Compound 4e (1.0 mmol) was dissolved in DMF (10.0 v/g) and stirred at room temperature. HATU (1.2 mmol), NaHCO₃ (2.0 mmol), and compound 8 (1.3 mmol) were added, respectively. The mixture was reacted under continuous stirring at constant temperature for 12 hours until the starting materials disappeared as monitored. The solution was diluted with ethyl acetate (10.0 v/g), washed twice with water. The aqueous phase was in turn washed with ethyl acetate once. The organic phases were combined, dried, and concentrated. The residue was purified by column chromatography to obtain compound 5e as off-white foamy solid, which was directly used in the next step.

Step 5: The above white solid 5e (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and filtered. The filter cake was washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-5).

¹H NMR (600 MHz, DMSO) δ 9.53 (d, J=7.4 Hz, 1H), 6.87 (s, 1H), 4.62 (d, J=7.5 Hz, 1H), 4.31 (d, J=5.7 Hz, 1H), 2.08 (dd, J=13.1, 6.6 Hz, 1H), 1.45 (s, 3H), 1.30 (s, 3H), 0.96 (dd, J=15.5, 6.7 Hz, 6H). ¹³C NMR (151 MHz, DMSO) δ 172.4, 169.9, 166.0, 163.6, 161.8, 111.2, 110.1, 87.6, 68.2, 61.4, 30.2, 23.9, 20.9, 19.0, 18.3. HRMS: cacled for C₁₅H₂₁N₅O₉S₂ [M+Na] 502.0673, found 502.0661.

Preparation Example 6: Synthesis of Compound (A-6)

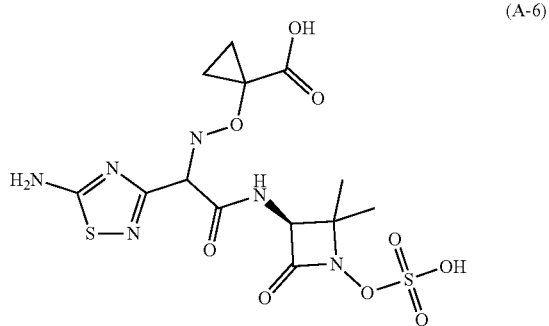 [SMILES: CC1(C)[C@H](NC(=O)C(NOC2(C(=O)O)CC2)c2nsc(N)n2)C(=O)N1OS(=O)(=O)O]

Step 3: Compound 7c was dispersed in methanol (10.0 v/g). Compound 3a in methanol was added under stirring at room temperature. The mixture was reacted under stirring at constant temperature for 30 minutes until the starting materials were completely converted as monitored by TLC. The solvent was removed by evaporation under reduced pressure. The residue was purified by column chromatography to obtain compound 4e as off-white solid [¹H NMR (600 MHz, DMSO) δ(ppm) 8.84 (s, 1H), 7.51-7.15 (m, 25H), 6.86 (s, 2H), 1.48-1.28 (in, 4H)].

Step 4: Compound 4e (1.0 mmol) was dissolved in DMF (10.0 v/g) and stirred at room temperature. HATU (1.2 mmol), NaHCO₃ (2.0 mmol), and compound 8 (1.3 mmol) were added, respectively. The mixture was reacted under continuous stirring at constant temperature for 12 hours until the starting materials disappeared as monitored. The solution was diluted with ethyl acetate (10.0 v/g), and washed twice with water. The aqueous phase was in turn washed with ethyl acetate once. The organic phases were combined, dried, and concentrated. The residue was purified by column chromatography to obtain compound 5e as off-white foamy solid [¹H NMR (600 MHz, DMSO) δ(ppm) 9.29 (d, J=7.9 Hz, 1H), 8.91 (s, 1H), 7.45-7.43 (m, 3H), 7.36-7.33 (m, 6H), 7.32-7.22 (m, 15H), 6.86 (s, 1H), 6.76 (d, J=0.5 Hz, 1H), 4.56 (d, J=7.9 Hz, 1H), 1.50-1.40 (m, 5H), 1.30 (m, 2H), 1.20 (s, 2H)].

Step 5: The above white solid 5e (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and filtered. The filter cake was washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-6).

¹H NMR (600 MHz, DMSO) δ(ppm) 9.40 (d, J=7.9 Hz, 1H), 6.89 (s, 1H), 4.62 (d, J=8.0 Hz, 1H), 1.44 (s, 3H), 1.36 (m, 4H), 1.25 (s, 3H). ¹³C NMR (151 MHz, DMSO) δ(ppm) 173.7, 169.8, 161.9, 111.6, 68.3, 63.3, 61.3, 60.2, 23.8, 21.0, 16.2. ¹³C NMR (151 MHz, DMSO) δ 173.7, 169.8, 161.9, 111.6, 68.3, 63.3, 61.3, 60.2, 23.8, 21.0, 16.2. HRMS: calcd for C₁₃H₁₆N₆O₉S₂ [M-H] 463.0347.

Preparation Example 7: Synthesis of Compound (A-7)

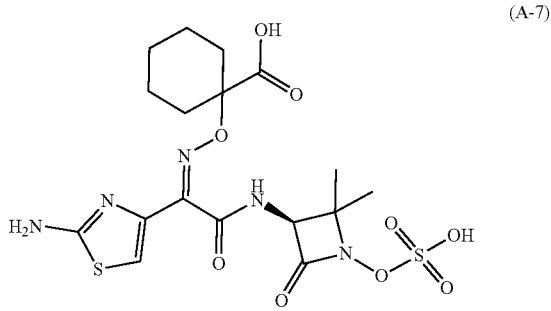 [SMILES: CC1(C)[C@H](NC(=O)/C(=N\OC2(C(=O)O)CCCCC2)c2csc(N)n2)C(=O)N1OS(=O)(=O)O]

Step 1: Compound 1g

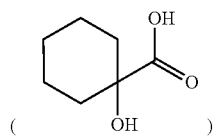

(1.0 mmol) and diphenylbromomethane (1.1 mmol) were dispersed in toluene (10.0 v/g) and stirred at room temperature. DBU (1.5 mmol) was added. The mixture was heated to 70-80° C., reacted under stirring for 12-16 hours until the starting materials were not further reduced as monitored by TLC, and cooled to room temperature. The reaction solution was extracted with the addition of water (10.0 v/g×2). The aqueous layer was in turn washed with ethyl acetate (10 v/g×2). The organic phases were combined, dried, and concentrated. The residue was purified by column chromatography to obtain compound 2g as translucent oil (and later solidified).

Step 2: Compound 2g (1.0 mmol) and diphenylphosphoryl hydroxylamine (1.1 mmol) were dispersed in anhydrous tetrahydrofuran solution (10.0 v/g), purged with nitrogen 3-4 times, and then stirred at 0° C. Subsequently, sodium tert-butoxide (1.5 mmol) was added. The mixture was reacted under stirring at constant temperature for 1 to 2 hours until the reactants were completely converted as monitored by TLC. The reaction solution was added with a saturated sodium chloride solution (5.0 v/g), stirred for 30 minutes and filtered to remove insoluble substances. The filter cake was washed with ethyl acetate. The filtrate was added with ethyl acetate (10.0 v/g) and water (5.0 v/g), and partitioned. The organic phase was washed with water once. The aqueous phases were combined and in turn washed with ethyl acetate. The organic phases were combined, dried and concentrated to obtain an oily compound 3g, which was directly used in the subsequent reaction without further purification.

Step 3: Compound 7c was dispersed in methanol (10.0 v/g). Compound 3g in methanol was added under stirring at room temperature. The mixture was reacted under stirring at constant temperature for 30 minutes until the starting materials were completely converted as monitored by TLC. The solvent was removed by evaporation under reduced pressure to obtain off-white solid compound 4g as crude product, which was directly used in the next reaction step.

Step 4: Compound 4g (1.0 mmol) was dissolved in DMF (10.0 v/g) and stirred at room temperature. HATU (1.2 mmol), NaHCO$_3$ (2.0 mmol), and compound 8 (1.3 mmol) were added, respectively. The mixture was reacted under continuous stirring at constant temperature for 12 hours until the starting materials disappeared as monitored. The solution was diluted with ethyl acetate (10.0 v/g), and washed with water twice. The aqueous phase was in turn washed with ethyl acetate once. The organic phases were combined, dried, and concentrated to obtain compound 5g crude product as off-white foamy solid, which was directly used in the next reaction step.

Step 5: the above white solid 5g (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature.

The residue was added with ethyl acetate, stirred at room temperature for 1 hour, and filtered. The filter cake was further washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (A-7).

$^1$H NMR (600 MHz, DMSO) δ 9.37 (s, 1H), 6.72 (s, 1H), 4.60 (d, 1H), 4.22 (s, 1H), 2.02 (s, 1H), 1.43 (s, 3H), 1.29 (s, 3H), 0.93 (s, 6H). HRMS: calcd for $C_{17}H_{23}N_5O_9S_2$ [M-H] 504.0864, found 504.0850.

The specific synthetic routes of compounds (B-1) to (B-2) are shown below:

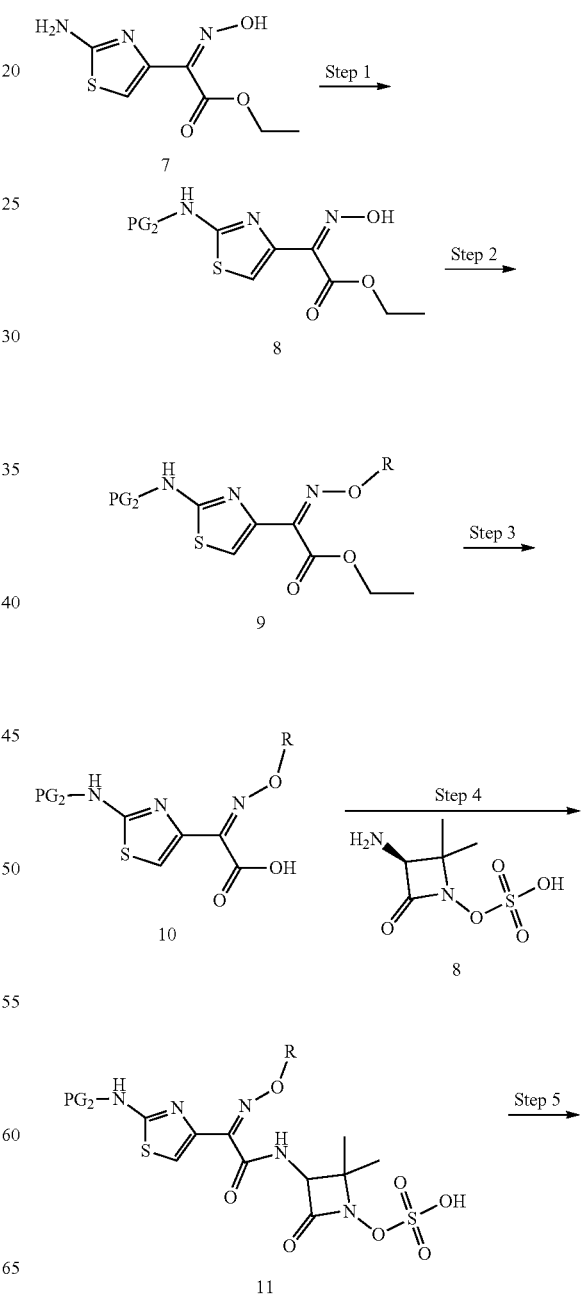

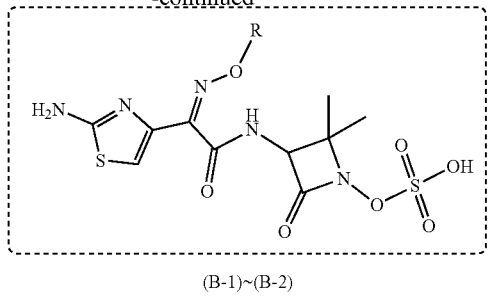

(B-1)~(B-2)

Preparation Example 8: Synthesis of Compound (B-1)

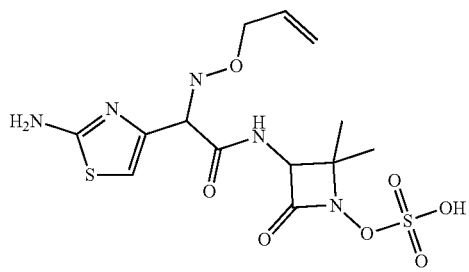

(B-1)

Step 1: Compound 7 (1.0 mmol) was dissolved in DMF (10.0 v/g); triethylamine (2.0 mmol) was added; and triphenylchloromethane (1.2 mmol) was added in batches. The mixture was reacted under stirring at room temperature for 6 hours until the reaction was completed as monitored by TLC, and then extracted with water/ethyl acetate. The organic phases were combined, dried, and concentrated to obtain the target compound 8a as crude product.

Step 2: Compound 8a (1.0 mmol) was dissolved in DMF (10.0 v/g). $K_2CO_3$ (2.0 mmol) and allyl bromide (1.2 mmol) were added successively. The mixture was reacted under stirring at room temperature for 6 hours until the reaction was completed as monitored by TLC, and then extracted with water/ethyl acetate. The organic phases were combined, dried, and concentrated to obtain the target compound 9a as crude product.

Step 3: Compound 9a (1.0 mmol) was dissolved in 1,4-dioxane (5 v/g)/water (5 v/g) and stirred at room temperature. Sodium hydroxide (5.0 mmol) was added. The mixture was reacted under continuous stirring until the starting materials disappeared as monitored by TLC. The 1,4-dioxane was removed by evaporation under reduced pressure. The solution was adjusted to pH 2-3, and then stirred for 10 minutes and filtered. The filter cake was washed with water until the filtrate was neutral. The filter cake was collected and dried to obtain compound 10a.

Step 4: Compound 10a (1.0 mmol) was dissolved in DMF (10.0 v/g) and stirred at room temperature. HATU (1.2 mmol), $NaHCO_3$ (2.0 mmol), and compound 8 (1.3 mmol) were added, respectively. The mixture was reacted under continuous stirring at constant temperature for 12 hours until the starting materials disappeared as monitored. The mixture was diluted with ethyl acetate (10.0 v/g), and washed with water twice. The aqueous phase was in turn washed with ethyl acetate once. The organic phases were combined, dried, and concentrated to obtain off-white foamy solid compound 11a, which was directly used in the next reaction step.

Step 5: the above white solid 11a (1.0 mmol) was dissolved in anhydrous dichloromethane (10.0 v/g) and stirred at −5 to −10° C. Triethylsilane (2.0 mmol) and trifluoroacetic acid (100.0 mmol) were added therein. The mixture was reacted at constant temperature for 5-6 hours until the reaction was completed as monitored by TLC. The solvent was removed by evaporation under reduced pressure at room temperature. The residue was added with ethyl acetate, stirred at room temperature for 1 hour, and filtered. The filter cake was washed with ethyl acetate three times, collected and dried. The above solid was dissolved in methanol/water, and subjected to preparation and isolation by pre-HPLC (YMC ODS-A, 5 um, 10*250 mm, 2.5 mL/min, 2%-50% acetonitrile/0.1% formic acid-water) to obtain the target product (B-1).

$^1$H NMR (600 MHz, DMSO) δ(ppm) 9.60 (d, J=7.8 Hz, 1H), 6.85 (s, 1H), 6.00-5.60 (m, 1H), 5.36-5.31 (m, 1H), 5.24-5.21 (m, 1H), 4.64 (dd, J=5.4, 1.3 Hz, 2H), 4.62 (d, J=7.8 Hz, 1H), 1.44 (s, 3H), 1.26 (s, 4H). HRMS: calcd for $C_{13}H_{17}O_7N_5S_2$ [M-H]$^+$ 418.0486, found 418.0484.

Preparation Example 9: Synthesis of Compound (B-2)

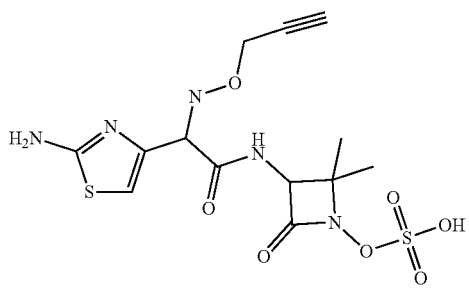

(B-2)

For the method for synthesizing compound (B-2), please refer to the synthesis of compound (B-1).

$^1$H NMR (600 MHz, DMSO) δ(ppm) 9.64 (d, J=7.8 Hz, 1H), 6.89 (s, 1H), 4.76 (s, 2H), 4.61 (d, J=7.8 Hz, 1H), 3.57 (t, J=2.4 Hz, 1H), 1.44 (s, 3H), 1.28 (s, 3H). HRMS: calcd for $C_{13}H_{14}O_7N_5S_2$ [M-H]$^+$ 416.0329, found 416.0315.

<Biological Activity Tests>

Antibacterial Activity-Evaluating Method (MIC Assay)

In this study, the compounds of the present invention were tested for their antibacterial activities by using two-fold dilution agar plating method and Denley Multipoint Inoculator A400 according to the guidelines of the CLSI/NCCLS standard. The tested strains were amplified by hydrolyzed casein peptone (Mueller-Hinton Agar) broth and Brain and Heart Infusion. The strains used in this study were bacterial strains that were purchased from ATCC or clinically isolated in Chinese hospitals. Aztreonam, polymyxin or levofloxacin was used as positive control. The drugs were diluted with hydrolyzed casein peptone broth to the desired concentrations including 128.0, 64.0, 32.0, 16.0, 8.0, 4.0, 2.0, 1.0, 0.5, 0.25, 0.125, 0.06 and 0.03 μg/mL, and then placed respectively into each well and mixed thoroughly. After inoculation, the tested strains were incubated for 18 hours at a constant temperature of 35° C., and their growth levels were observed. The drug concentration with no microbial growth in the well was recorded as the lowest Minimal Inhibitory Concentration (MIC). The compounds A-1 to A-7 and B-1 to B-2 according to the present invention, and aztreonam (AZN), colistin B and levofloxacin as the controls, exhibited antibacterial activities as shown in Tables 1 to 4 below.

TABLE 1

| Strain Name | Strain No. | Drug resistance | A-5 | A-7 | A-2 | A-3 | A-4 | A-1 |
|---|---|---|---|---|---|---|---|---|
| Escherichia coli | ATCC 25922 | ESBLs(−) | 16 | 4 | 0.12 | 0.25 | 0.25 | 0.12 |
| | ATCC 35218 | ESBLs(+) | 16 | 1 | 0.06 | 0.25 | 0.12 | 0.06 |
| | CDC1001728 | NDM-1(+) | 32 | 2 | 0.5 | 0.5 | 0.5 | 0.25 |
| | 16-1 | ESBLs(+) | 8 | 1 | 0.06 | 0.25 | 0.12 | 0.06 |
| | 16-7 | ESBLs(−) | 32 | 2 | 0.12 | 0.5 | 0.25 | 0.12 |
| | 08-85 | mcr-1(+) | 32 | 2 | 0.12 | 0.25 | 0.25 | 0.12 |
| | 13-43 | mcr-1(+) | 32 | 2 | 0.12 | 0.5 | 0.25 | 0.12 |
| | 13-66 | mcr-1(+) | 16 | 2 | 0.12 | 0.25 | 0.25 | 0.12 |
| | 17-R28 | CRE,NDM-1(+) | >64 | 64 | 16 | 8 | 8 | 4 |
| Klebsiella Pneumoniae | ATCC 700603 | ESBLs(+) | 64 | 8 | 1 | 1 | 2 | 4 |
| | ATCC BAA-2146 | NDM-1(+) | >64 | 8 | 0.25 | 0.5 | 0.5 | 0.5 |
| | 16-2 | ESBLs(−) | 32 | 2 | 2 | 2 | 1 | 2 |
| | 16-14 | ESBLs(+) | 16 | 2 | 0.12 | 0.5 | 0.25 | 0.12 |
| | 09-20 | mcr-1(+) | 16 | 2 | 0.12 | 0.25 | 0.12 | 0.06 |
| | 17-R27 | CRE | 32 | 4 | 0.25 | 0.25 | 0.25 | 0.25 |
| Pseudomonas aeruginosa | ATCC 27853 | | >64 | 32 | 4 | 4 | 8 | 8 |
| | PAO1 | | >64 | 32 | 1 | 2 | 4 | 2 |
| | 16-11 | | >64 | >64 | 4 | 4 | 8 | 8 |

| Strain Name | Strain No. | Drug resistance | A-6 | B-1 | B-2 | AZN | Colistin B | Levo-floxacin |
|---|---|---|---|---|---|---|---|---|
| Escherichia coli | ATCC 25922 | ESBLs(−) | 0.5 | 0.5 | 0.5 | 0.06 | 1 | ≤0.03 |
| | ATCC 35218 | ESBLs(+) | 0.25 | 0.5 | 0.25 | ≤0.03 | 1 | ≤0.03 |
| | CDC1001728 | NDM-1(+) | 4 | 4 | 4 | 4 | 1 | 8 |
| | 16-1 | ESBLs(+) | 0.5 | 0.25 | 0.25 | ≤0.03 | 0.5 | 0.5 |
| | 16-7 | ESBLs(−) | 0.5 | 0.25 | 0.5 | 0.06 | 1 | 0.5 |
| | 08-85 | mcr-1(+) | 4 | 0.5 | 0.5 | 4 | 8 | 16 |
| | 13-43 | mcr-1(+) | 4 | 1 | 1 | 8 | 8 | 32 |
| | 13-66 | mcr-1(+) | 4 | 1 | 1 | 8 | 8 | 32 |
| | 17-R28 | CRE, NDM-1(+) | >64 | — | — | 16 | — | 8 |
| Klebsiella Pneumoniae | ATCC 700603 | ESBLs(+) | 64 | 16 | 16 | 32 | 2 | 0.5 |
| | ATCC BAA-2146 | NDM-1(+) | 32 | 4 | 8 | >128 | 1 | 128 |
| | 16-2 | ESBLs(−) | 0.5 | 0.5 | 0.5 | 0.06 | 1 | 0.06 |
| | 16-14 | ESBLs(+) | 4 | 0.5 | 1 | 4 | 1 | 0.5 |
| | 09-20 | mcr-1(+) | 2 | 1 | 1 | 0.25 | 16 | 16 |
| | 17-R27 | CRE | — | — | — | 0.25 | — | — |
| Pseudomonas aeruginosa | ATCC 27853 | | 16 | 64 | >64 | 4 | 4 | 1 |
| | PAO1 | | 8 | 16 | 32 | 4 | 8 | 4 |
| | 16-11 | | 16 | >64 | >64 | >128 | 4 | 0.5 |

TABLE 2

| Strain Name | Strain No. | Drug resistance | A-5 | A-7 | A-2 | A-3 | A-4 | A-1 |
|---|---|---|---|---|---|---|---|---|
| Acinetobacter baumannii | ATCC 19606 | | >64 | 32 | 16 | 32 | 64 | 16 |
| | 16-16 | | >64 | >64 | >64 | >64 | >64 | 64 |
| | 16-33 | | >64 | 32 | 16 | 32 | 32 | 32 |
| Enterobacter cloacae | ATCC 43560 | | 16 | 1 | 0.12 | 0.5 | 0.12 | 0.06 |
| | CDC1000654 | | >64 | 16 | 2 | 4 | 1 | 2 |
| Enterobacter aerogenes | ATCC 13048 | | 32 | 4 | 1 | 0.5 | 0.5 | 0.12 |
| Salmonella typhi | H901 | | 32 | 4 | 0.12 | 0.5 | 0.12 | 0.06 |
| Serratia marcescens | ATCC 21074 | | 32 | 2 | 0.25 | 0.5 | 0.25 | 0.25 |
| Citrobacter freundii | ATCC 43864 | | 16 | 2 | 0.12 | 0.25 | 0.12 | 0.12 |
| Providencia rettgeri | ATCC 31052 | | 4 | 0.25 | ≤0.03 | ≤0.03 | ≤0.03 | ≤0.03 |
| Proteus vulgaris | ATCC 29905 | | 4 | 0.25 | ≤0.03 | ≤0.03 | ≤0.03 | ≤0.03 |
| Proteus mirabilis | ATCC 49565 | | 1 | 0.12 | ≤0.03 | 0.06 | ≤0.03 | ≤0.03 |
| Stenotrophomonas maltophilia | ATCC 13636 | | >64 | 16 | 4 | 4 | 8 | 8 |
| Shigella flexneri | ATCC 12022 | | 64 | 2 | 0.25 | 0.25 | 0.25 | 0.12 |

TABLE 2-continued

| Strain Name | Strain No. | Drug resistance | A-6 | B-1 | B-2 | AZN | Colistin B | Levo-floxacin |
|---|---|---|---|---|---|---|---|---|
| Acinetobacter baumannii | ATCC 19606 | | 16 | 8 | 4 | 32 | 1 | 0.25 |
| | 16-16 | | >64 | 32 | 32 | 128 | 1 | 16 |
| | 16-33 | | 16 | 8 | 4 | 32 | 2 | 2 |
| Enterobacter cloacae | ATCC 43560 | | 0.5 | 0.25 | 0.5 | ≤0.03 | >64 | ≤0.03 |
| | CDC1000654 | | 64 | 8 | 8 | >128 | 1 | 32 |
| Enterobacter aerogenes | ATCC 13048 | | 1 | 1 | 1 | 0.12 | 2 | 0.06 |
| Salmonella typhi | H901 | | 0.5 | 0.25 | 0.5 | ≤0.03 | 1 | ≤0.03 |
| Serratia marcescens | ATCC 21074 | | 1 | 1 | 0.5 | 0.12 | >64 | 0.12 |
| Citrobacter freundii | ATCC 43864 | | 0.25 | 0.5 | 0.5 | 0.12 | 2 | ≤0.03 |
| Providencia rettgeri | ATCC 31052 | | ≤0.03 | ≤0.03 | ≤0.03 | v0.03 | >64 | ≤0.03 |
| Proteus vulgaris | ATCC 29905 | | ≤0.03 | ≤0.03 | ≤0.03 | ≤0.03 | >64 | ≤0.03 |
| Proteus mirabilis | ATCC 49565 | | 1 | 0.125 | 0.06 | ≤0.03 | >64 | ≤0.03 |
| Stenotrophomonas maltophilia | ATCC 13636 | | 32 | 16 | 32 | 32 | >64 | 2 |
| Shigella flexneri | ATCC 12022 | | 0.06 | 0.5 | 0.5 | 0.25 | 0.5 | 0.06 |

TABLE 3

| | Drug No. | | z22g | zz2g | z19g | z20g | z21g | z18g |
|---|---|---|---|---|---|---|---|---|
| Strain Name | Strain No. | Drug resistance | A-5 | A-7 | A-2 | A-3 | A-4 | A-1 |
| Escherichia coli | ATCC 25922 | ESBLs(−) | 16 | 4 | 0.12 | 0.25 | 0.25 | 0.12 |
| | ATCC 35218 | ESBLs(+) | 16 | 1 | 0.06 | 0.25 | 0.12 | 0.06 |
| | CDC1001728 | NDM-1(+) | 32 | 2 | 0.5 | 0.5 | 0.5 | 0.25 |
| | 16-1 | ESBLs(+) | 8 | 1 | 0.06 | 0.25 | 0.12 | 0.06 |
| | 16-7 | ESBLs(−) | 32 | 2 | 0.12 | 0.5 | 0.25 | 0.12 |
| | 08-85 | mcr-1(+) | 32 | 2 | 0.12 | 0.25 | 0.25 | 0.12 |
| | 13-43 | mcr-1(+) | 32 | 2 | 0.12 | 0.5 | 0.25 | 0.12 |
| | 13-66 | mcr-1(+) | 16 | 2 | 0.12 | 0.25 | 0.25 | 0.12 |
| | 17-R28 | CRE, NDM-1(+) | >64 | 64 | 16 | 8 | 8 | 4 |
| Klebsiella Pneumoniae | ATCC 700603 | ESBLs(+) | 64 | 8 | 1 | 1 | 2 | 4 |
| | ATCC BAA-2146 | NDM-1(+) | >64 | 8 | 0.25 | 0.5 | 0.5 | 0.5 |
| | 16-2 | ESBLs(−) | 32 | 2 | 2 | 2 | 1 | 2 |
| | 16-14 | ESBLs(+) | 16 | 2 | 0.12 | 0.5 | 0.25 | 0.12 |
| | 09-20 | mcr-1(+) | 16 | 2 | 0.12 | 0.25 | 0.12 | 0.06 |
| | 17-R27 | CRE | 32 | 4 | 0.25 | 0.25 | 0.25 | 0.25 |
| Pseudomonas aeruginosa | ATCC 27853 | | >64 | 32 | 4 | 4 | 8 | 8 |
| | PAO1 | | >64 | 32 | 1 | 2 | 4 | 2 |
| | 16-11 | | >64 | >64 | 4 | 4 | 8 | 8 |

| | Drug No. | | L01c A-6 | AL-1 B-1 | AL-3 B-2 | AZN | Colistin B Control | Levo-floxacin |
|---|---|---|---|---|---|---|---|---|
| Strain Name | Strain No. | Drug resistance | | | | | | |
| Escherichia coli | ATCC 25922 | ESBLs(−) | 0.5 | 0.5 | 0.5 | 0.06 | 1 | ≤0.03 |
| | ATCC 35218 | ESBLs(+) | 0.25 | 0.5 | 0.25 | ≤0.03 | 1 | ≤0.03 |
| | CDC1001728 | NDM-1(+) | 4 | 4 | 4 | 4 | 1 | 8 |
| | 16-1 | ESBLs(+) | 0.5 | 0.25 | 0.25 | ≤0.03 | 0.5 | 0.5 |
| | 16-7 | ESBLs(−) | 0.5 | 0.25 | 0.5 | 0.06 | 1 | 0.5 |
| | 08-85 | mcr-1(+) | 4 | 0.5 | 0.5 | 4 | 8 | 16 |
| | 13-43 | mcr-1(+) | 4 | 1 | 1 | 8 | 8 | 32 |
| | 13-66 | mcr-1(+) | 4 | 1 | 1 | 8 | 8 | 32 |
| | 17-R28 | CRE, NDM-1(+) | >64 | — | — | 16 | — | 8 |
| Klebsiella Pneumoniae | ATCC 700603 | ESBLs(+) | 64 | 16 | 16 | 32 | 2 | 0.5 |
| | ATCC BAA-2146 | NDM-1(+) | 32 | 4 | 8 | >128 | 1 | 128 |

TABLE 3-continued

|  |  |  |  |  |  |  |  |  |
|---|---|---|---|---|---|---|---|---|
|  | 16-2 | ESBLs(−) | 0.5 | 0.5 | 0.5 | 0.06 | 1 | 0.06 |
|  | 16-14 | ESBLs(+) | 4 | 0.5 | 1 | 4 | 1 | 0.5 |
|  | 09-20 | mcr-1(+) | 2 | 1 | 1 | 0.25 | 16 | 16 |
|  | 17-R27 | CRE |  | — |  | 0.25 | — | — |
| Pseudomonas aeruginosa | ATCC 27853 |  | 16 | 64 | >64 | 4 | 4 | 1 |
|  | PAO1 |  | 8 | 16 | 32 | 4 | 8 | 4 |
|  | 16-11 |  | 16 | >64 | >64 | >128 | 4 | 0.5 |

TABLE 4

| | | | Drug No. | | | | | |
|---|---|---|---|---|---|---|---|---|
| Strain Name | Strain No. | Drug resistance | z22g A-5 | zz2g A-7 | z19g A-2 | z20g A-3 | z21g A-4 | z18g A-1 |
| Acinetobacter baumannii | ATCC 19606 | | >64 | 32 | 16 | 32 | 64 | 16 |
| | 16-16 | | >64 | >64 | >64 | >64 | >64 | 64 |
| | 16-33 | | >64 | 32 | 16 | 32 | 32 | 32 |
| Enterobacter cloacae | ATCC 43560 | | 16 | 1 | 0.12 | 0.5 | 0.12 | 0.06 |
| | CDC1000654 | | >64 | 16 | 2 | 4 | 1 | 2 |
| Enterobacter aerogenes | ATCC 13048 | | 32 | 4 | 1 | 0.5 | 0.5 | 0.12 |
| Salmonella typhi | H901 | | 32 | 4 | 0.12 | 0.5 | 0.12 | 0.06 |
| Serratia marcescens | ATCC 21074 | | 32 | 2 | 0.25 | 0.5 | 0.25 | 0.25 |
| Citrobacter freundii | ATCC 43864 | | 16 | 2 | 0.12 | 0.25 | 0.12 | 0.12 |
| Providencia rettgeri | ATCC 31052 | | 4 | 0.25 | <0.03 | ≤0.03 | <0.03 | ≤0.03 |
| Proteus vulgaris | ATCC 29905 | | 4 | 0.25 | <0.03 | ≤0.03 | ≤0.03 | ≤0.03 |
| Proteus mirabilis | ATCC 49565 | | 1 | 0.12 | <0.03 | 0.06 | <0.03 | <0.03 |
| Stenotrophomonas maltophilia | ATCC 13636 | | >64 | 16 | 4 | 4 | 8 | 8 |
| Shigella flexneri | ATCC 12022 | | 64 | 2 | 0.25 | 0.25 | 0.25 | 0.12 |

| | | | Drug No. | | | | | |
|---|---|---|---|---|---|---|---|---|
| Strain Name | Strain No. | Drug resistance | L01c A-6 | AL-1 B-1 | AL-3 B-2 | AZN | Colistin B | Levo-floxacin |
| Acinetobacter baumannii | ATCC 19606 | | 16 | 8 | 4 | 32 | 1 | 0.25 |
| | 16-16 | | >64 | 32 | 32 | 128 | 1 | 16 |
| | 16-33 | | 16 | 8 | 4 | 32 | 2 | 2 |
| Enterobacter cloacae | ATCC 43560 | | 0.5 | 0.25 | 0.5 | ≤0.03 | >64 | ≤0.03 |
| | CDC1000654 | | 64 | 8 | 8 | >128 | 1 | 32 |
| Enterobacter aerogenes | ATCC 13048 | | 1 | 1 | 1 | 0.12 | 2 | 0.06 |
| Salmonella typhi | H901 | | 0.5 | 0.25 | 0.5 | ≤0.03 | 1 | ≤0.03 |
| Serratia marcescens | ATCC 21074 | | 1 | 1 | 0.5 | 0.12 | >64 | 0.12 |
| Citrobacter freundii | ATCC 43864 | | 0.25 | 0.5 | 0.5 | 0.12 | 2 | ≤0.03 |
| Providencia rettgeri | ATCC 31052 | | ≤0.03 | ≤0.03 | ≤0.03 | ≤0.03 | >64 | ≤0.03 |
| Proteus vulgaris | ATCC 29905 | | ≤0.03 | ≤0.03 | ≤0.03 | ≤0.03 | >64 | ≤0.03 |
| Proteus mirabilis | ATCC 49565 | | 1 | 0.125 | 0.06 | ≤0.03 | >64 | ≤0.03 |
| Stenotrophomonas maltophilia | ATCC 13636 | | 32 | 16 | 32 | 32 | >64 | 2 |
| Shigella flexneri | ATCC 12022 | | 0.06 | 0.5 | 0.5 | 0.25 | 0.5 | 0.06 |

Note: in the above tables, ESBLs means β-lactamase; NDM-1 means new Delhi metallo-β-lactamase, type I; CRE means Carbapenem-resistant Enterobacteriaceae; (+) means presence of resistance, (−) means absence of resistance; and if there is no record under the drug resistance item, it means that the enzyme through which the bacteria shows the resistance are not limited.

From Tables 1-4, it can be seen that the β-lactam compounds according to the present invention, as compared with aztreonam, colistin B and levofloxacin as the controls, were applied at lower minimum inhibitory concentration, had better antibacterial efficacy against bacteria, especially against Gram-negative bacteria, and showed extremely lower drug resistance, and thus they are suitable for the preparation of an antibacterial agent with excellent properties.

INDUSTRIAL APPLICABILITY

The β-lactam compound according to the present invention is suitable for use in the manufacture of an antibacterial agent having excellent antibacterial efficacy while showing negligible drug resistance.

The invention claimed is:

1. A compound of the general formula (I):

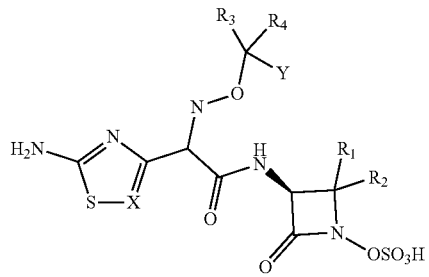
(I)

wherein, $R_1$ and $R_2$, independently of one another, represent an optionally substituted linear or branched $C_{1-10}$ alkyl;

$R_3$ and $R_4$ together form a $C_{3-5}$ cycloalkyl;

X represents CH or N; and

Y represents carboxyl; or a compound of the general formula (B):

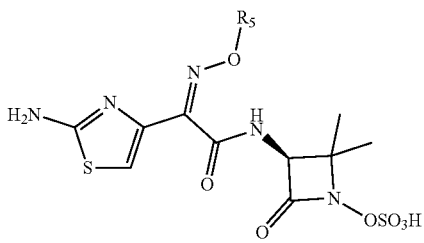
(B)

wherein, $R_5$ represents a $C_{3-7}$ alkenyl or alkynyl; or a compound of formula (A-4):

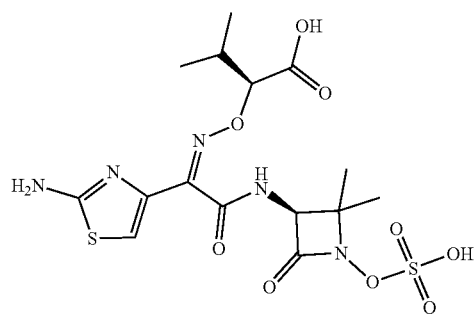
(A-4)

or a pharmaceutically acceptable salt thereof.

2. The compound of claim 1, wherein $R_1$ and $R_2$, independently of one another, represent methyl.

3. The compound of claim 1 or 2, wherein X represents C.

4. The compound of claim 1 or 2, wherein the compound is selected from the compounds as shown below:

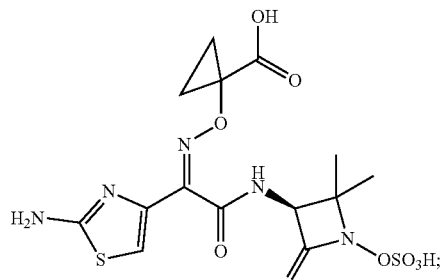
(A-1)

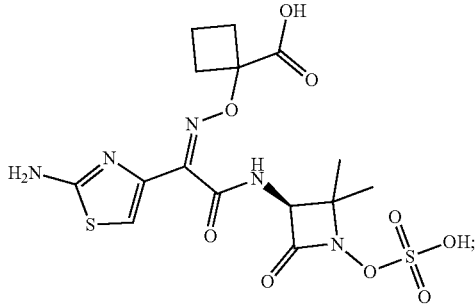
(A-2)

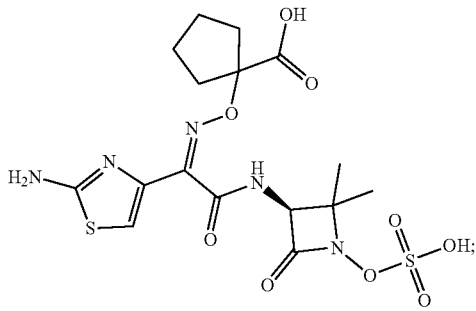
(A-3)

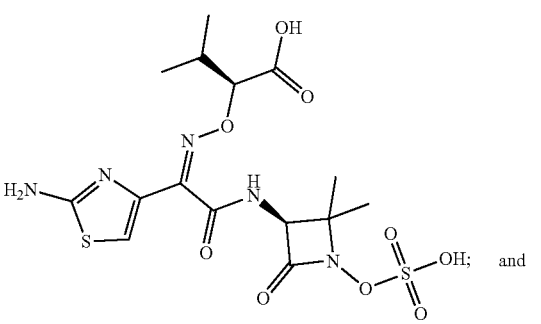
(A-4) and

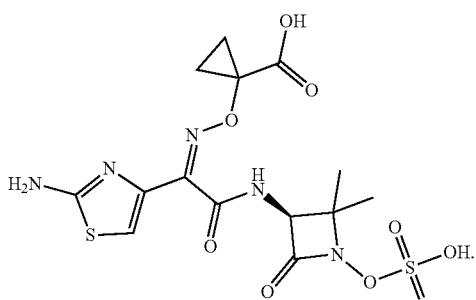
(A-5)

5. The compound of claim 1, wherein the compound is as shown in the following general formula (B):

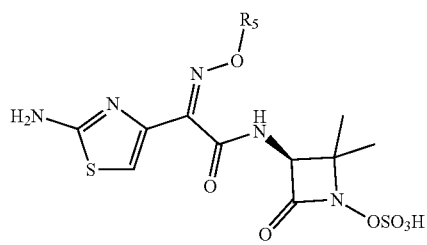

(B)

wherein,

R₅ is a C₃₋₇ alkenyl or alkynyl.

6. The compound of claim 5, wherein the compound is selected from the compounds as shown below:

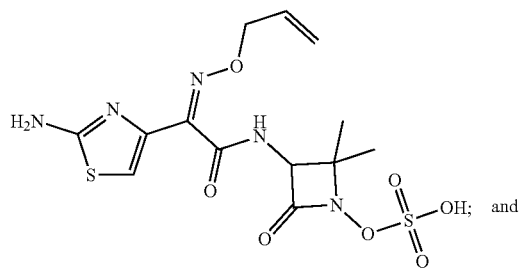

(B-1)

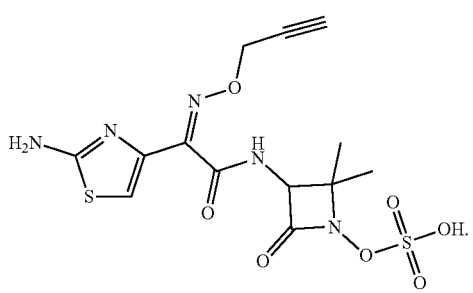

(B-2)

7. A method for preparing a compound of the general formula (I), or a pharmaceutically acceptable salt thereof, comprising:

reacting a compound of formula (1) with a compound of formula (2) to obtain a compound of formula (3)

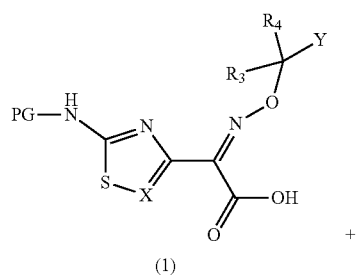

(1)

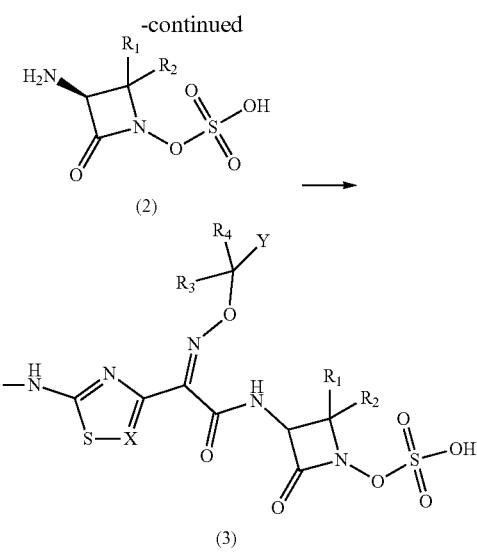

wherein,
PG represents a protecting group;
R₁ and R₂, independently of one another, represent an optionally substituted linear or branched C₁₋₁₀ alkyl; or
R₃ and R₄ together form a C₃₋₅ cycloalkyl;
X represents CH or N; and
Y represents carboxyl;
or
reacting a compound of formula (1') with a compound of formula (2') to obtain a compound of formula (3')

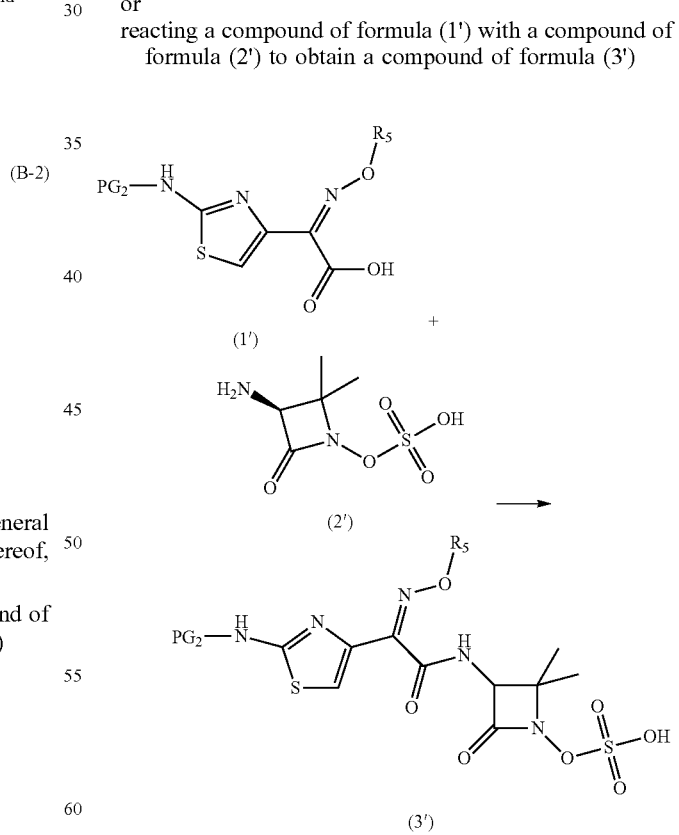

wherein,
PG₂ represents a protecting group, and
R₅ represents a C₃₋₇ alkenyl or alkynyl; or
reacting a compound of formula (1") with a compound of formula (2') to obtain a compound of formula (3")

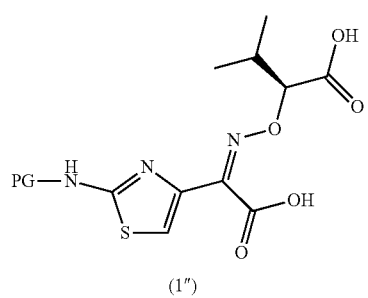

(1″)

+

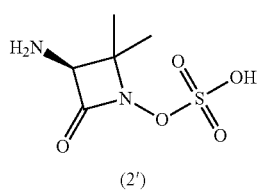

(2′)

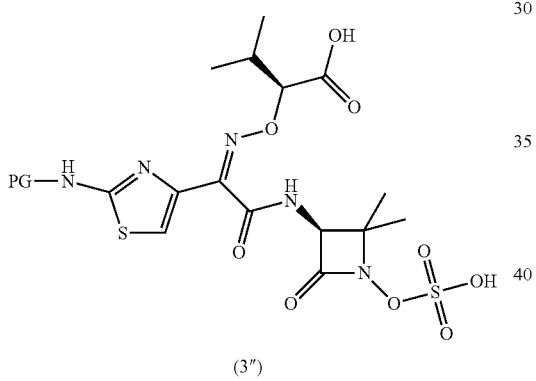

(3″)

wherein,
PG represents a protecting group; and
removing the protecting group by reacting the compound of formula (3), the compound of formula (3′) or the compound of formula (3″) with trifluoroacetic acid and triethylsilane to obtain the compound of the general formula (I)

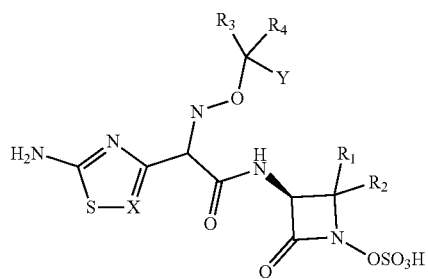

wherein,
$R_1$, $R_2$, $R_3$, $R_4$, X and Y are as defined above, or
a compound of the general formula (B):

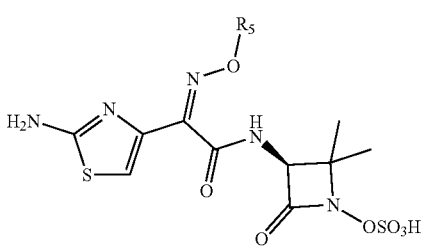

wherein,
$R_5$ is defined as above; or
a compound of formula (A-4):

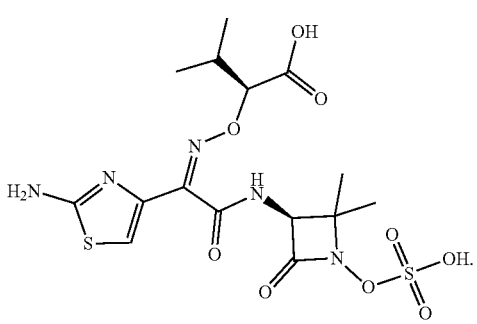

8. A method for treating a bacterial infection against Gram-negative bacteria in a subject in need thereof, comprising administering to the subject a therapeutically effective amount of the compound of formula (I):

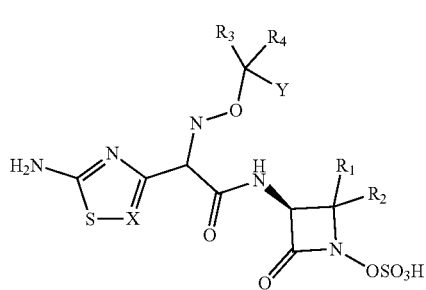

wherein,

R₁ and R₂, independently of one another, represent an optionally substituted linear or branched $C_{1-10}$ alkyl;

R₃ and R₄ together form a $C_{3-5}$ cycloalkyl;

X represents CH or N; and

Y represents carboxyl; or a compound of the general formula (B):

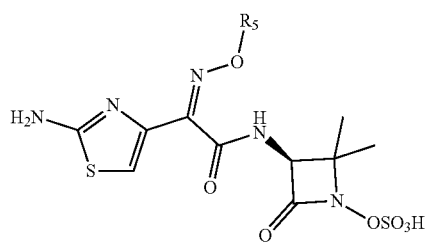

(B)

wherein,

R₅ represents a $C_{3-7}$ alkenyl or alkynyl; or a compound of formula (A-4):

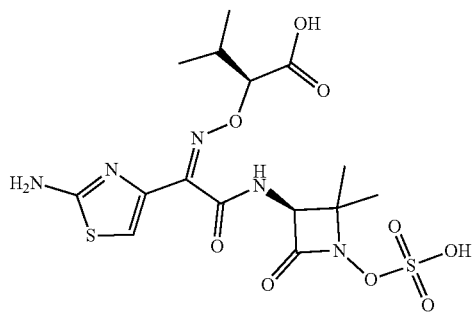

(A-4)

or a pharmaceutically acceptable salt thereof.

9. The compound of claim 1 or 2, wherein the compound is as shown in the following formula:

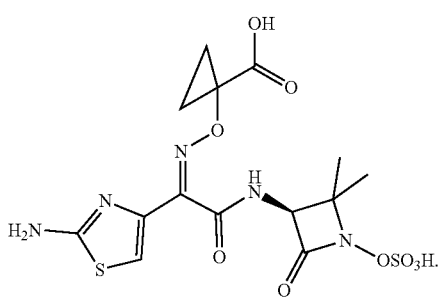

(A-1)

* * * * *